(12) United States Patent
Balog et al.

(10) Patent No.: US 7,668,281 B2
(45) Date of Patent: Feb. 23, 2010

(54) METHOD AND TOOLING FOR DISMANTLING, CASKING AND REMOVAL OF NUCLEAR REACTOR CORE STRUCTURES

(75) Inventors: Leonard J. Balog, Naples, FL (US);
Thomas A. Hackley, New Kensington, PA (US); Arthur W. Kramer, Jeannette, PA (US)

(73) Assignee: Westinghouse Electric Co LLC, Cranberry Township, PA (US)

( * ) Notice: Subject to any disclaimer, the term of this patent is extended or adjusted under 35 U.S.C. 154(b) by 272 days.

(21) Appl. No.: 11/623,864

(22) Filed: Jan. 17, 2007

(65) Prior Publication Data

US 2009/0285345 A1 Nov. 19, 2009

Related U.S. Application Data

(60) Provisional application No. 60/762,392, filed on Jan. 26, 2006.

(51) Int. Cl.
*G21C 19/00* (2006.01)
(52) U.S. Cl. .................. 376/260; 376/302; 376/461; 376/463
(58) Field of Classification Search ................. 376/260, 376/262, 302, 461, 463
See application file for complete search history.

*Primary Examiner*—Rick Palabrica

(57) ABSTRACT

A method is provided for removing radioactive internals structural members in the core of a reactor pressure vessel in a containment vessel. The method includes placing a first cask in a first internals assembly, detaching radioactive first internals structural members from second internals structural members in the first internals assembly, placing the detached first internals structural members in the first cask, placing the first internals assembly in a second cask, and removing the second cask containing the first internals assembly and containing the casked detached radioactive first internals members from the containment vessel. The first internal members may be radioactive baffle plates, and the second internals members may be former plates bolted to the radioactive baffle plates. Novel tooling, framework and fixtures facilitate disassembling, moving and storing the radioactive baffle plates.

17 Claims, 18 Drawing Sheets

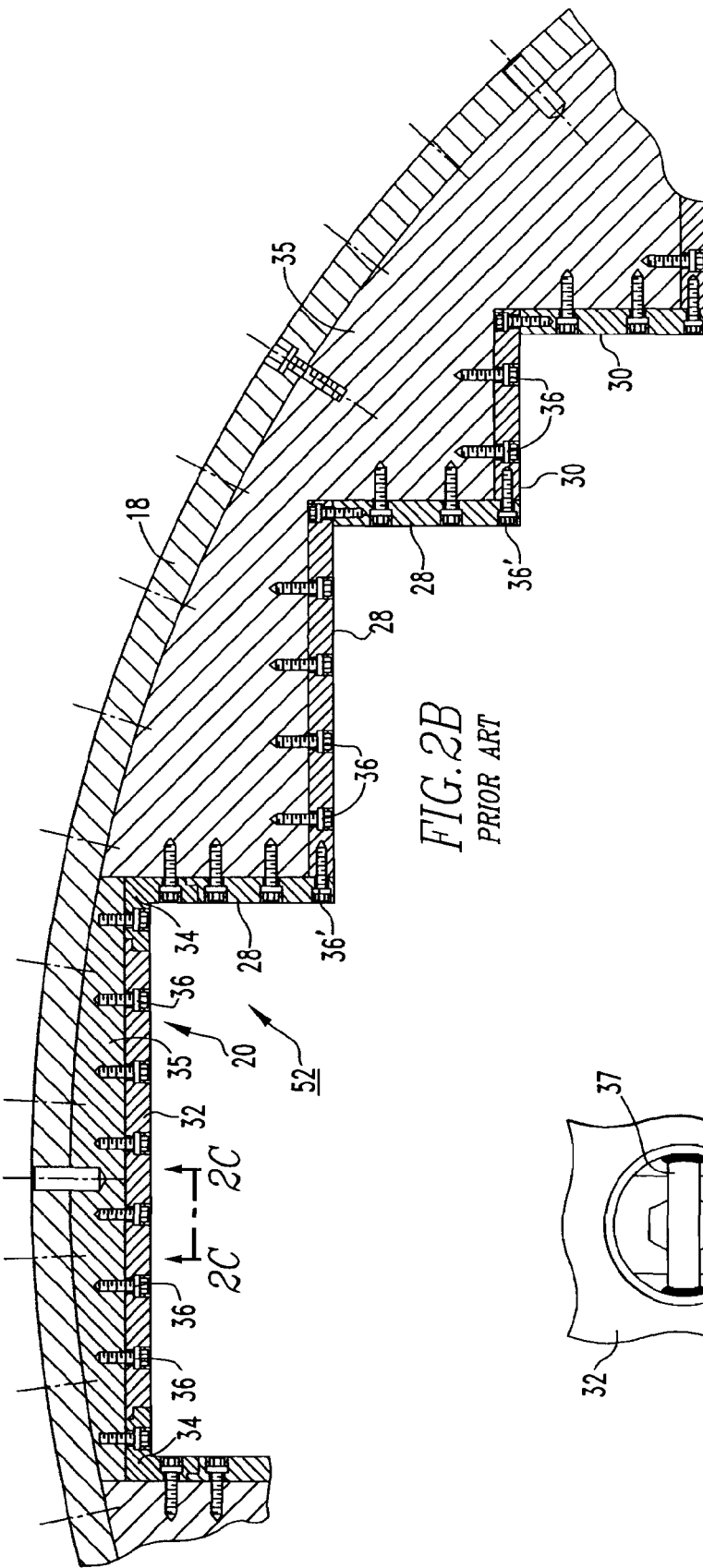
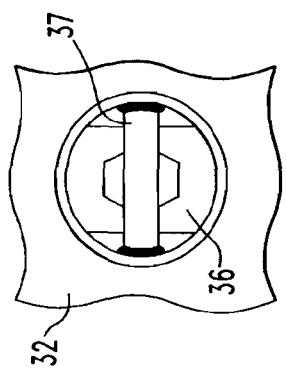
FIG. 2B
PRIOR ART
FIG. 2C
PRIOR ART

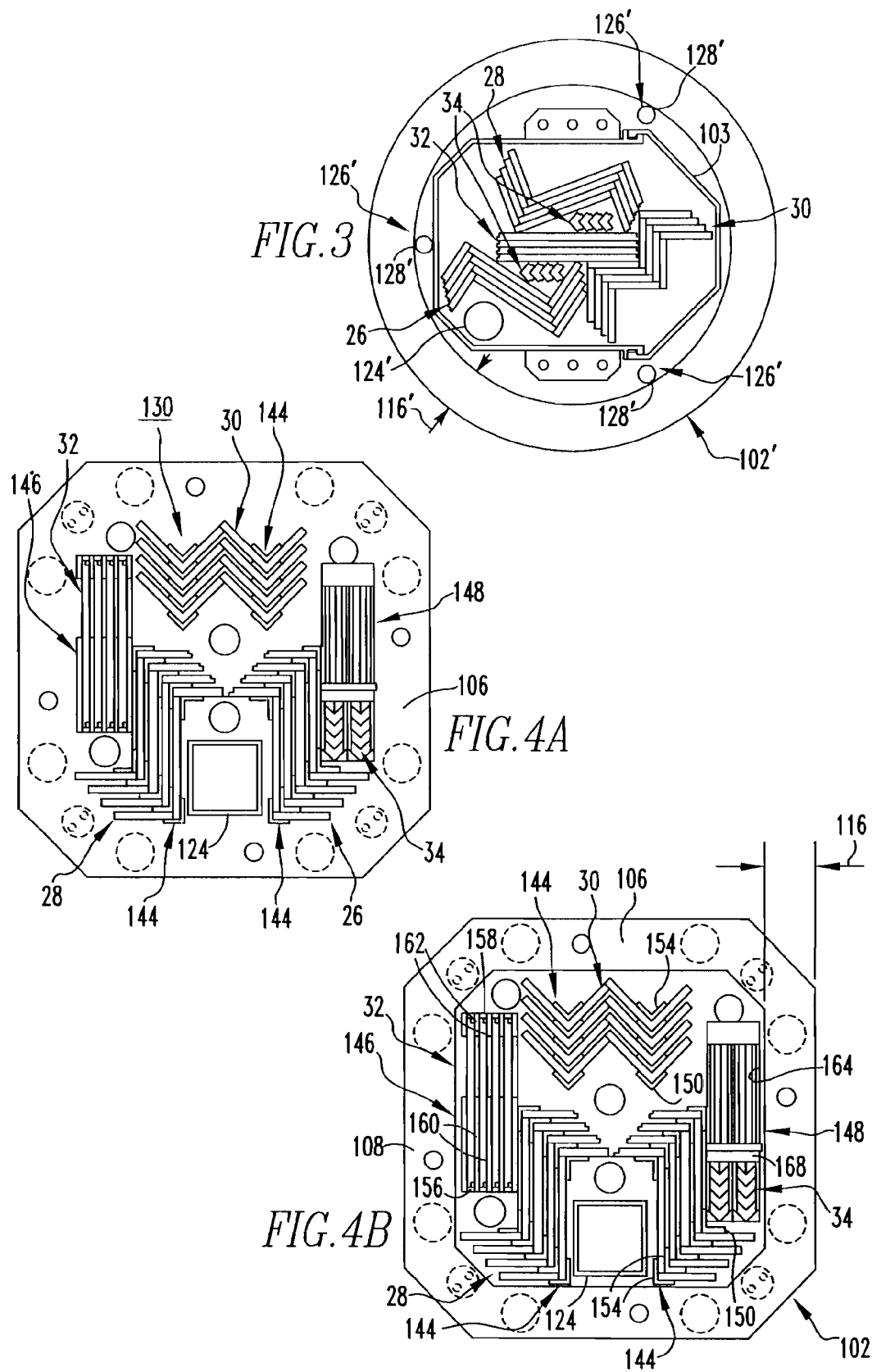

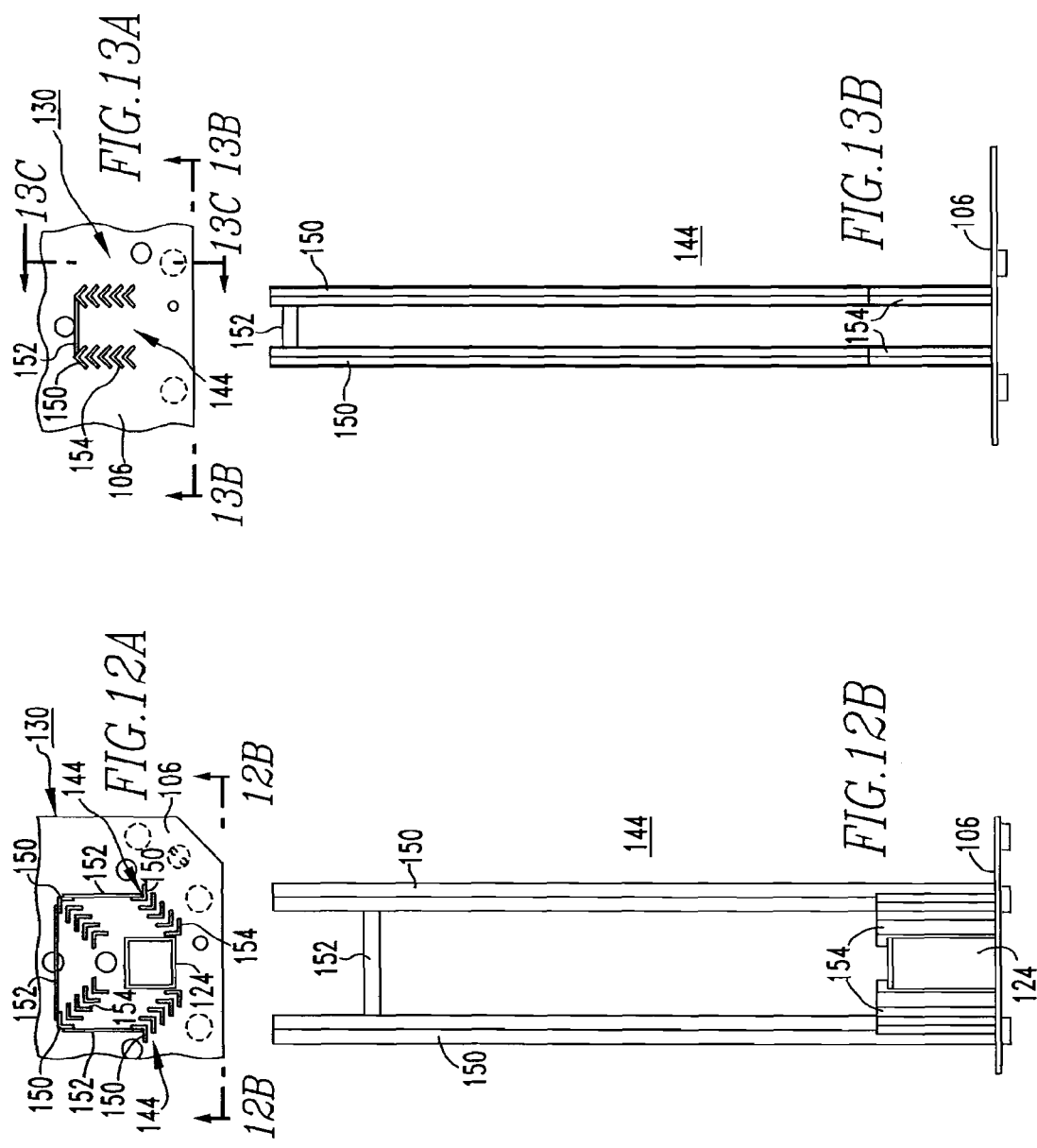

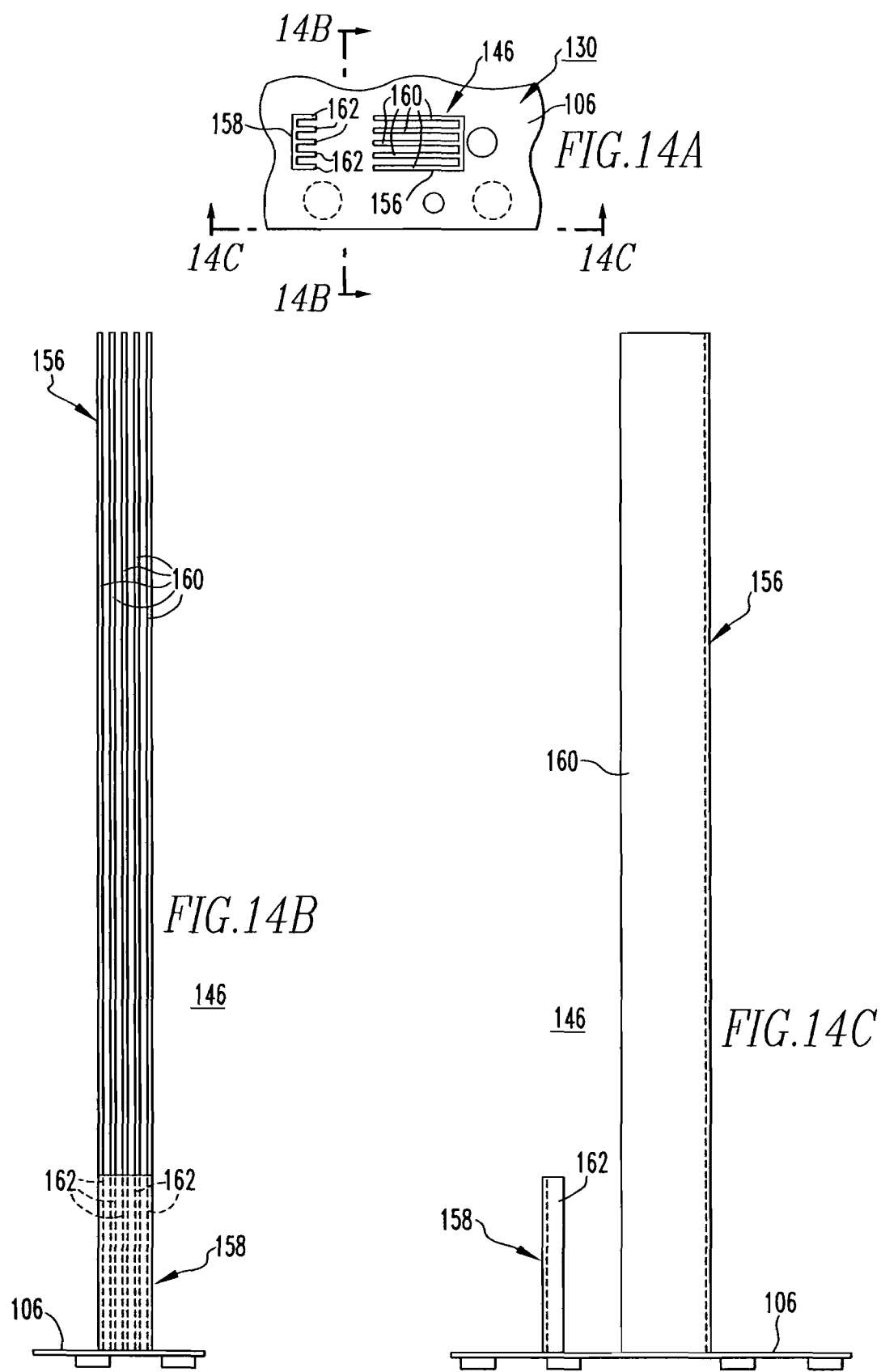

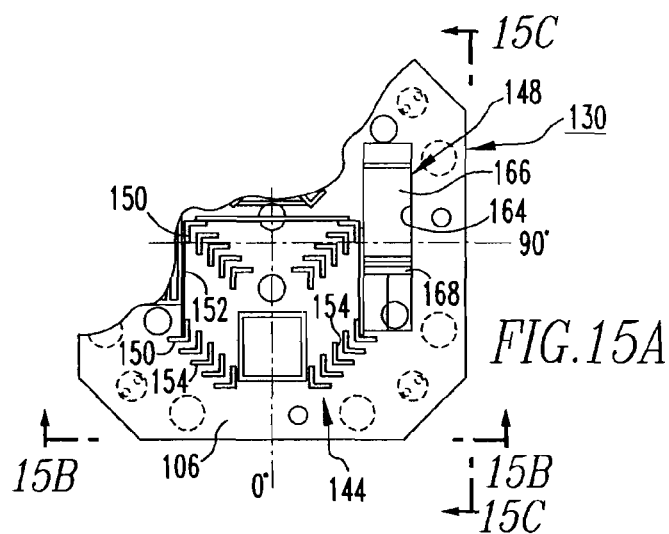
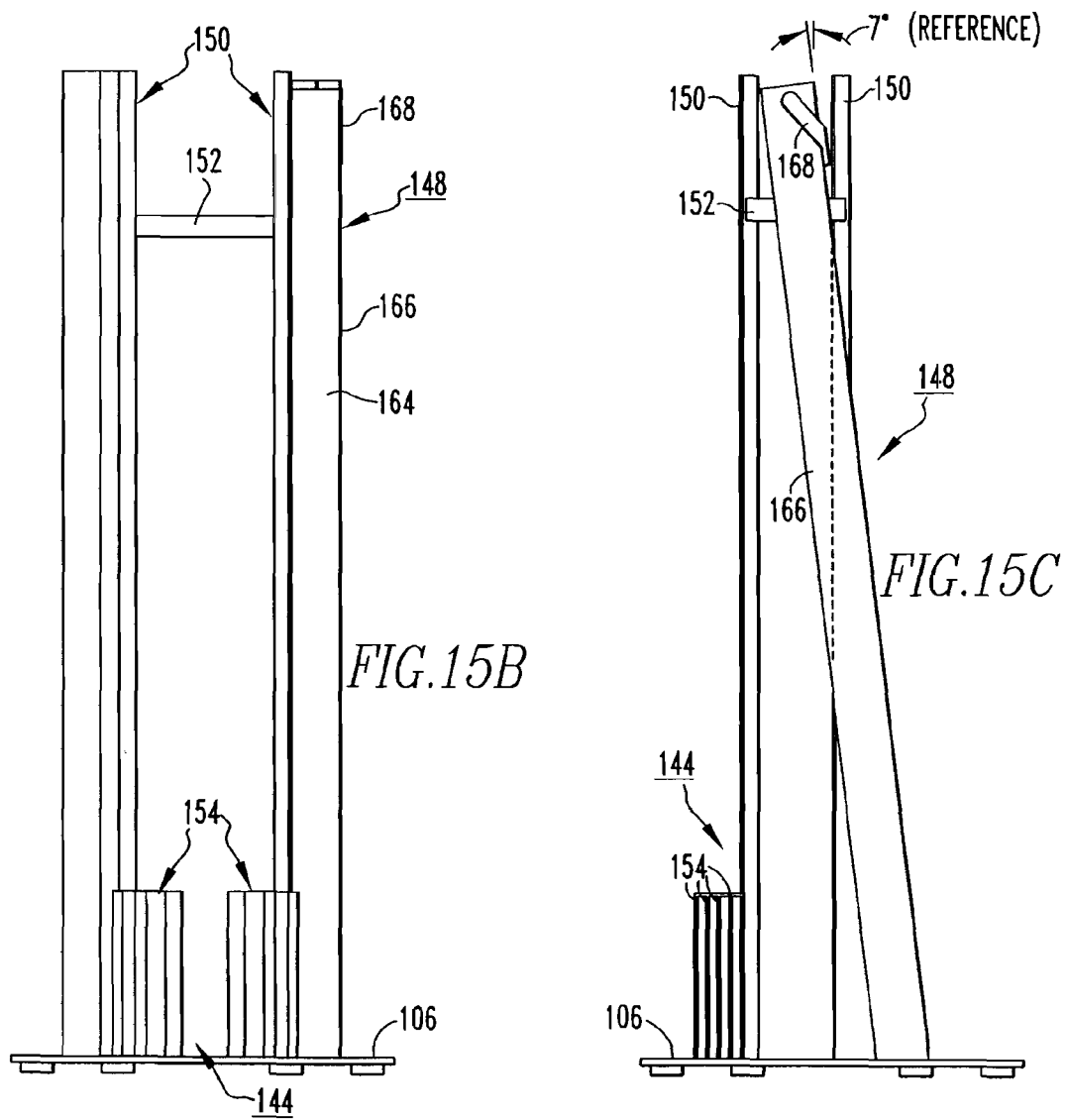
FIG.15A
FIG.15B
FIG.15C

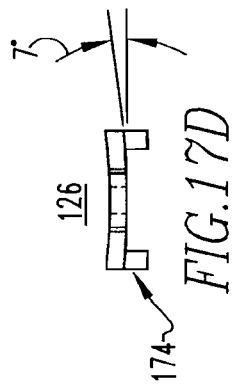
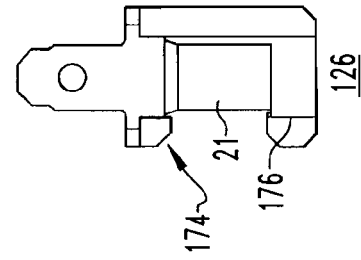
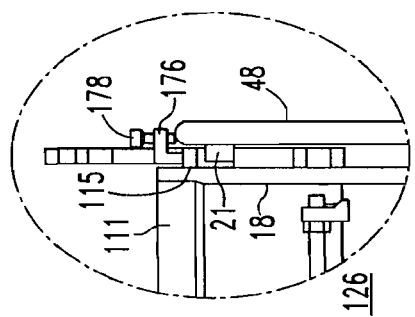
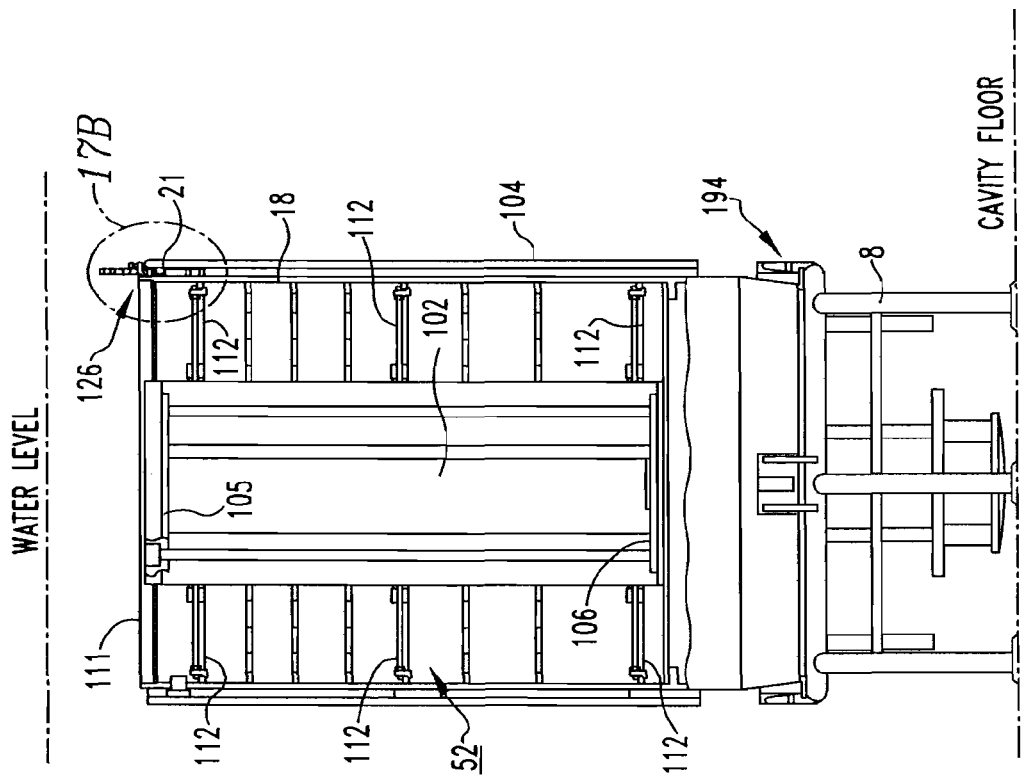

METHOD AND TOOLING FOR DISMANTLING, CASKING AND REMOVAL OF NUCLEAR REACTOR CORE STRUCTURES

CROSS-REFERENCE TO RELATED APPLICATION

This application claims the priority of Provisional Application Ser. No. 60/762,392, filed Jan. 26, 2006, entitled "PROCESS AND UNIQUE TOOLING FOR DISMANTLING, CASKING AND REMOVAL OF NUCLEAR REACTOR CORE."

BACKGROUND OF THE INVENTION

1. Field of the Invention

The invention relates generally to nuclear reactors and, more particularly, to methods and tooling for dismantling, casking and removing nuclear reactor core structures from the containment building, for example, for on-site storage of transport off-site for disposal.

2. Background Information

As nuclear reactors age, utility companies desired to extend plant life. There is also a desire for design upgrades in some circumstances. Accordingly, the replacement of reactor internals (e.g., core structures) is coming into prominence.

To remove and replace radioactive structural members of the reactor internals efficiently and cost-effectively, a number of factors must be taken into account. Among them is the very important priority of minimizing the exposure of personnel to radiation. It is also necessary to minimize plant outage duration, and to limit the size and weight of the disposable segments of the internals. For example, to minimize costs, it is desirable that the capacity of the existing crane, which is typically present at the containment building for the nuclear reactor, is not exceeded. It is also desirable that the casked segments can exit the containment building through the existing equipment hatch. Unfortunately, prior proposals do not satisfy these criteria. Rather, they typically require the existing equipment hatch to be enlarged or an alternate opening to be provided which is sufficiently large in size, for example, by breaking through the concrete and rebar of the containment building. The building must then be restored after the task is completed, at great expense. This is because such proposals require a cask which is quite large, and thus heavy, in order to house and adequately shield the radioactive internals which are to be disposed therein. Specifically, the cask or casks which generally comprise thick walled cylinders that enclose the internals to provide the shielding function, must satisfy the allowable radiation dose level on the outer surfaces of the cask(s), as prescribed by well-established health physics guidelines. This generally results in the cask(s) having relatively thick walls, thus being large and heavy. Accordingly, a special, enlarged opening, and specialized lifting equipment, including a larger capacity crane than the existing on-site crane, are required.

By way of example, one known project wherein the upper and lower internals of Shikoku Electric Power Company's Ikata Unit No. 1 were replaced, required a single cask which was large (e.g., about 12 m in height and 3.8 m in outer diameter) and heavy (e.g., about 450 tons). Such a large cask severely limits the number of manufacturing vendors who have the necessary equipment to cast, machine and handle thick walled cylinders of the magnitude necessary. Additional disadvantages included extended material procurement and manufacturing schedules. Accordingly, such a process is cost-intensive.

There is a need, therefore, for an improved method and tooling for dismantling, casking and removing nuclear reactor core structures which overcomes the aforementioned disadvantages. Specifically, it is desirable to selectively dismantle highly radiated components and cask them in a fashion which significantly reduces the size and weight of disposal hardware.

There is, therefore, room for improvement in methods and tooling for dismantling, casking and removing nuclear reactor core structures.

SUMMARY OF THE INVENTION

These needs and others are met by embodiments of the invention, which are directed to an improved method and associated tooling for dismantling, casking and removing nuclear reactor core structures.

As one aspect of the invention, a method is provided for removing radioactive internals structural members in the core of a reactor pressure vessel in a containment vessel. The reactor pressure vessel houses a core barrel assembly. The method comprises the steps of: removing the core barrel assembly from the reactor pressure vessel; placing a first cask in a first internals assembly; detaching radioactive first internals structural members from second internals structural members of the first internals assembly; placing the detached first internals structural members in the first cask; placing the first internals assembly in a second cask; and removing the second cask containing the first internals assembly and containing the casked detached radioactive first internals members from the containment vessel, for example, for transport or on-site storage.

The first internal members may comprise radioactive baffle plates, and the second internals members may comprise former plates bolted to the radioactive baffle plates, wherein the step of detaching the radioactive first internals members from second internals members comprises unbolting the radioactive baffle plates from the former plates. The baffles plates may also have a plurality of segments, which are unbolted from the former plates. The bolts fastening the baffle plates to the former plates may be secured by lock bars which are welded to the baffles plates. Thus, the step of unbolting the radioactive baffle plates from the former plates may further comprises the steps of: placing a strong back near a baffle plate bolt; placing a tool between the strong back and the baffle plate bolt; placing a pneumatic cavity between the tool and the strong back; expanding the pneumatic cavity to urge the tool into engagement with the baffle plate bolt; cutting or breaking the lock bar securing the baffle plate bolt; and unbolting the baffle plate bolt with the tool. The strong back may be keyed with the first internals assembly to precisely position the strong back.

The first internals assembly may have a plate member disposed at one end of a barrel member, and the step of placing the first cask in the first internals assembly may comprise: placing the first cask on the first internals assembly plate member in spaced relationship from the barrel member. The first internals assembly plate member may further include guide members, and the first cask may have a base plate member, wherein the step of placing the first cask on the first internals assembly plate member and in spaced relationship from the barrel member comprises: lowering the first cask base plate member over the guide members. The first cask may have a number of detachable side wall members, and the step of placing the detached first internals structural members in the first cask may include placing the detached first internals structural members on the first cask base plate member after the first cask base plate is lowered over the guide members, and attaching the number of first cask detachable side wall members to the first cask base member base plate after the detached first internals structural members have been placed on the first cask base plate member.

The method may further comprise draining water from the first cask in the lower internals assembly, and/or positioning indexable guides in the first cask proximate the detached first members. The first cask and the second cask may each have a wall thickness, wherein the wall thickness of the first cask is greater than the wall thickness of the second cask. The wall thickness of the first cask may, for example, be at least twice the wall thickness of the second cask. The first cask and the second cask may also be made from substantially similar materials of construction. In one non-limiting embodiment of the invention, the detached first internals members may have radiation contact levels of at least 500,000 R/hr, and the second cask may be have an outside surface with a radiation level of about 800 mR/hr. or less. This level will allow the casked internals to be removed through the equipment hatch of the containment building and transferred to a storage bunker made, for example, from concrete and similar in concept to the bunkers that store casked spent fuel elements on site. The 800 mR/hr. contact level can be markedly reduced, if desired, by adding more shielding, without increasing the cask diameter. Removing the eight irradiation specimen baskets from the thermal shield outside diameter will permit the inside diameter of the lower cask to move radially inward by about 2.7 inches, increasing the cask wall thickness by this amount. As will be discussed hereinbelow, the upper cask can also increase shielding, again without increasing cask envelope diameter, if necessitated by the radiation levels on the upper core plate element in the upper internals. Additionally, the upper support plate of the upper internals can be vacuumed to remove radioactive crud and aggressive chemical decamination remains as another means of reducing radiation levels of non-activated elements of the internals.

The method may further comprise: severing the first internals assembly into a first section and a second section; placing a second internals assembly into the severed first section of the first internals assembly; placing the severed first section of the first internals assembly containing the second internals assembly into a third cask; and removing the third cask containing the severed first section of the first internals assembly and the second internals assembly from the containment vessel. The second internals assembly may have extending members, and the method may further comprise severing the extending members from the second internals assembly before the step of placing the second internals assembly in the third cask.

Tooling for use in facilitating the aforementioned method, is also disclosed.

BRIEF DESCRIPTION OF THE DRAWINGS

A full understanding of the invention can be gained from the following description of the preferred embodiments when read in conjunction with the accompanying drawings in which:

FIG. 2B is an enlarged view of a portion of the lower core barrel of FIG. 2A, showing the baffle plates-to-formers bolting arrangement thereof;

FIG. 2C is a vertical elevation view taken along line 2C-2C of FIG. 2B, showing a bolt and lock bar therefore;

FIG. 3 is a top plan view of the baffle plates stacked in a remnant canister all within a cask which is generally cylindrical, in accordance with an embodiment of the invention;

FIG. 4A is a top plan view of the base plate of a cask which is generally octagonal, in accordance with an embodiment of the invention, and a racking assembly therefore, with the cask removed and showing the baffle plates and segments disposed in the racks of the racking assembly;

FIG. 4B is a top plan view of the cask base plate, racking assembly therefore, and baffle plates and segments of FIG. 4A, also showing the generally octagonal cask in place;

FIG. 12A is a top plan view of a portion of the base plate and racking assembly of FIG. 11A;

FIGS. 12B is a vertical elevation view taken along line 12B-12B of FIG. 12A;

FIG. 13A is a top plan view of another portion of the base plate and racking assembly of FIG. 11A;

FIGS. 13B and 13C are vertical elevation views taken along lines 13B-13B and 13C-13C, respectively, of FIG. 13A;

FIG. 14A is a top plan view of another portion of the base plate and racking assembly of FIG. 11A;

FIGS. 14B and 14C are elevation views taken along lines 14B-14B and 14C-14C, respectively, of FIG. 14A;

FIG. 15A is a top plan view of another portion of the base plate and racking assembly of FIG. 11A;

FIGS. 15B and 15C are elevation views taken along lines 15B-15B and 15C-15C, respectively, of FIG. 15A;

FIG. 17A is a side elevation, partly in section view of the cask-in-cask assembly of FIG. 6 and a lifting fixture therefore, in accordance with an embodiment of the invention;

FIGS. 17B, 17C and 17D are two side elevation enlarged views, and a top plan view, respectively, of the lifting fixture of FIG. 17A;

DESCRIPTION OF THE PREFERRED EMBODIMENTS

Figure 1:
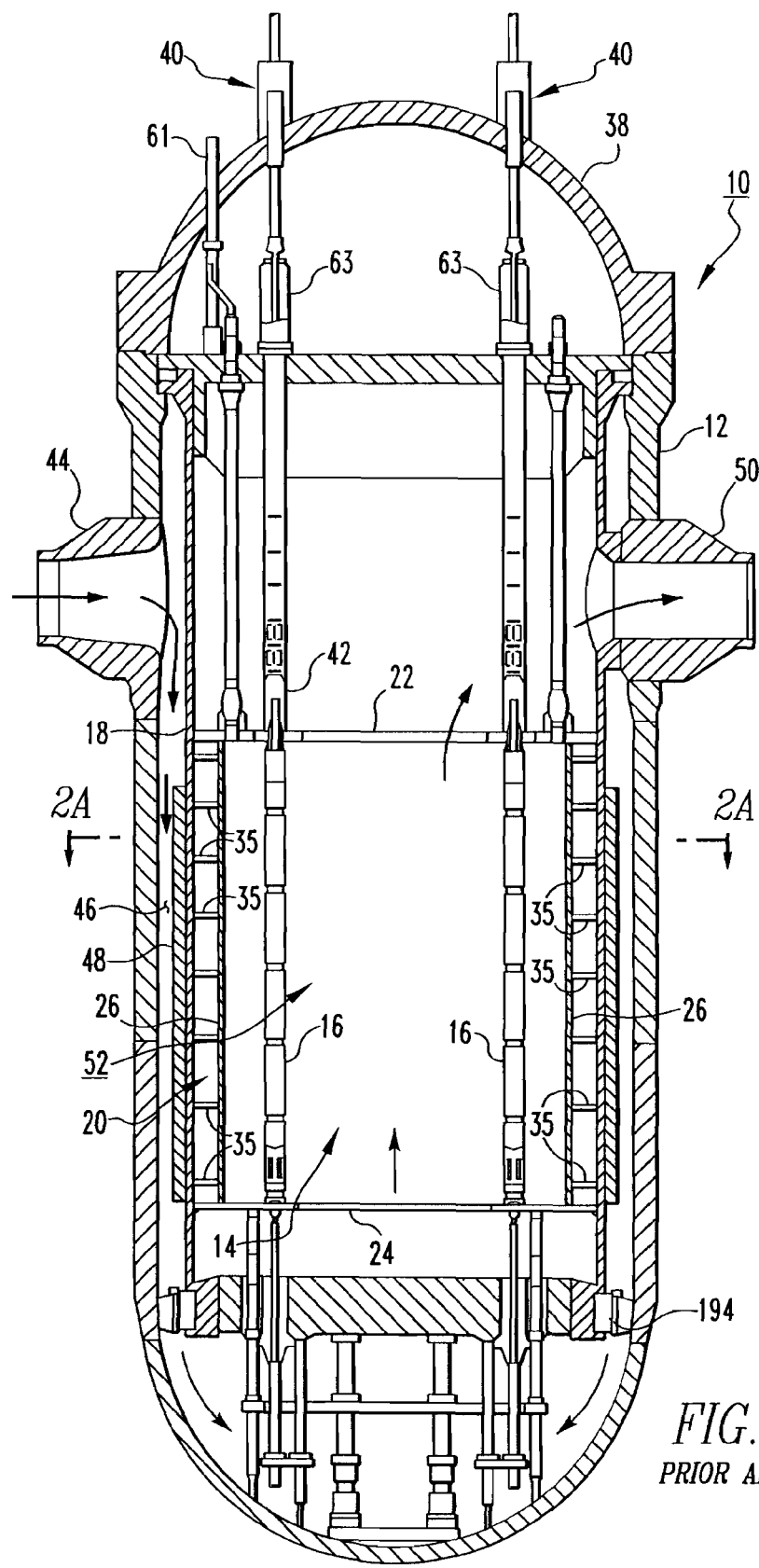
FIG. 1 is a vertical elevation, partly in section view of the pressure vessel and a portion of the internals of a pressurized water nuclear reactor core.

For purposes of illustration, embodiments of the invention will be described as applied to a standard 3-loop nuclear power plant (e.g., about 750 Megawatts) such as, for example and without limitation, a Westinghouse 3-loop nuclear power plant, although it will become apparent that they could also be adapted for implementation with nuclear power plants of any known or suitable size (e.g., without limitation, a 2-loop plant). Westinghouse Electric Company has a place of business in Pittsburgh, Pa.

Directional phases used herein, such as, for example, left, right, top, bottom, upper, lower, front, back and derivatives thereof, relate to the orientation of the elements shown in the drawings and are not limiting upon the claims unless expressly recited therein.

It will be appreciated that times, dimensions and other quantities discussed herein, are provided for example only, and are not meant to be limiting on the scope of the invention.

As employed herein, the term "cask" refers to any known or suitable container or vessel, or combination of containers or vessels, suitably structured to receive, secure and/or shield components (e.g., without limitation, radioactive structural members) of a nuclear reactor for storage and/or transportation thereof.

As employed herein, the term "casking" refers to the process of placing and/or storing nuclear reactor components within a suitable cask or combination of casks.

As employed herein, the term "strong back" refers to any known or suitable structural member such as, for example and without limitation, a beam or a bar member, which is sufficiently robust and strong to accommodate strain and/or to serve as a mounting base or foundation on which to securely mount tooling.

As employed herein, the term "internals" refers to the structures within the interior of a nuclear reactor such as, for example, the radioactive structural members of the reactor core that are located within the pressure vessel of the reactor. Accordingly, as used herein, the phrase "upper internals" refers to the interior structures of the reactor that are generally disposed in the top part of the pressure vessel (and above the mating line of the reactor flange and vessel head of the pressure vessel). Likewise, the phase "lower internals" refers to interior structures of the reactor that are generally disposed in the lower part of the pressure vessel (e.g., below the mating line).

As employed herein, the term "segment" refers to a portion which comprises a group or collection of parts of a whole, and expressly includes, without limitation, a collection of baffle plates which are removed, detached, disassembled or otherwise severed from the baffle assembly of a nuclear reactor as a unit, as opposed to individual plates of the baffle assembly. As will be described hereinbelow, the exemplary baffle plate segments include A plate segments, B plate segments and C plate segments as opposed to, for example, the exemplary individual D plates and angle plates of the baffle assembly.

As employed herein, the terms "key" and "keying" refer to any known or suitable interface configuration between two or more coupled components, wherein such interface configuration provides precise alignment between the components.

As employed herein, the term "pneumatic cavity" refers to any known or suitable device or mechanism such as, for example and without limitation, an inflatable bladder or a volume of air, which is provided for the purpose of establishing a predetermined, desired spacing relationship between a number of components and/or for facilitating movement of one component with respect to another (e.g., by inflating the inflatable bladder).

As employed herein, the statement that two or more parts are "coupled" together shall mean that the parts are joined together either directly or joined through one or more intermediate parts.

As employed herein, the term "number" shall mean one or an integer greater than one (i.e., a plurality).

FIG. 1 shows a non-limiting example of a pressurized water nuclear reactor (PWR) 10 of the type with which embodiments of the invention are employed. The PWR 10 includes a reactor pressure vessel 12 which houses a nuclear reactor core 14 composed of a plurality of elongated fuel assemblies 16. For simplicity of disclosure and ease of illustration, only two fuel assemblies 16 are shown in FIG. 1. In reality, however, the core 14 is composed of a great number of such fuel assemblies 16.

Figure 2A:
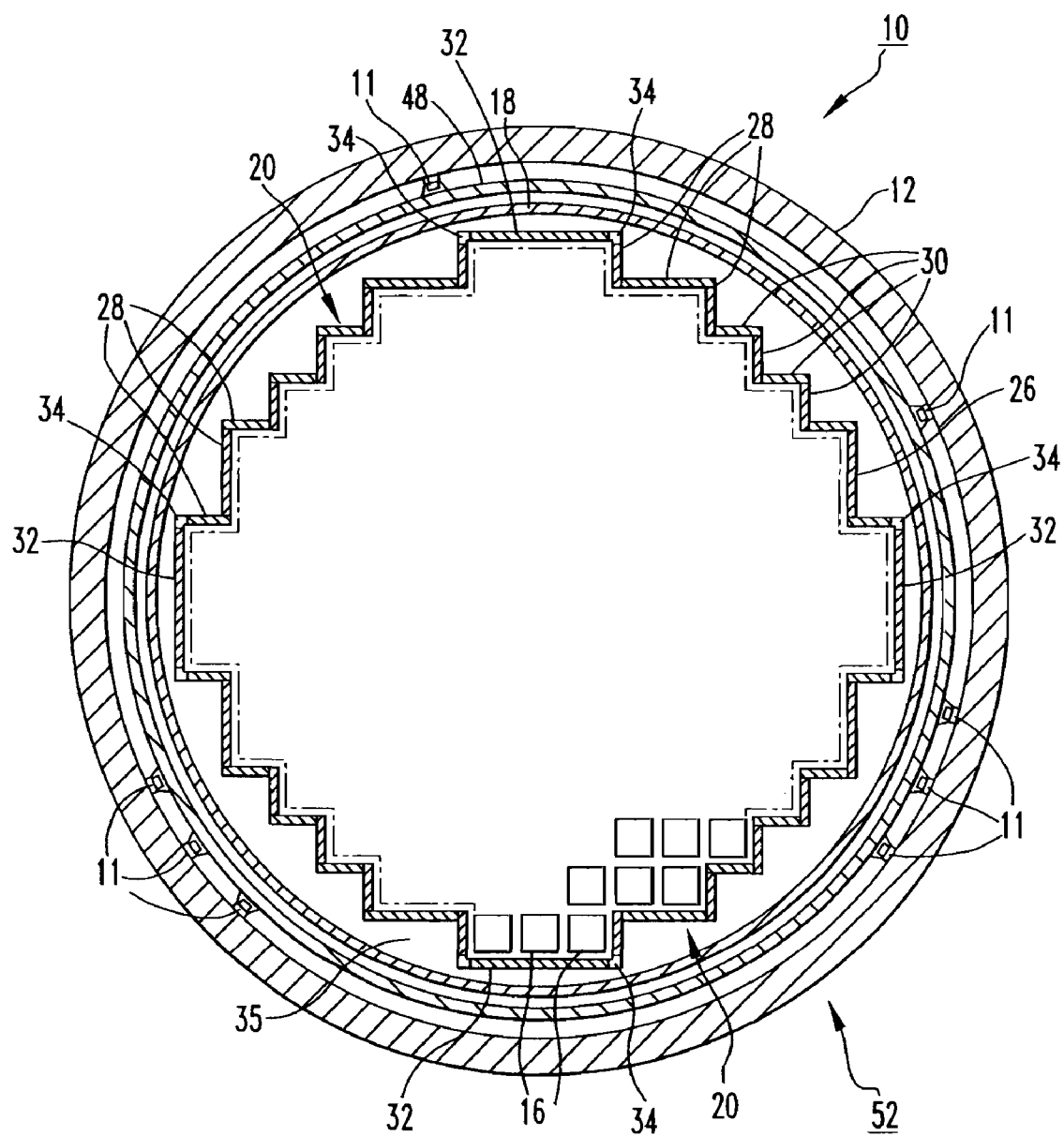
FIG. 2A is a sectional view taken along line 2A-2A of FIG. 1.

Spaced radially inwardly from the reactor vessel 12 is a generally cylindrical core barrel 18, and within the core barrel 18 is a former and baffle system, hereinafter called a baffle assembly 20. The reactor core 14 and the baffle assembly 20 are disposed between upper and lower core plates 22,24 which, in turn, are supported by the core barrel 18. The baffle assembly 20, which is also shown at least in part in FIGS. 2A and 2B, provides a transition from the generally cylindrical core barrel 18 to the squared-off periphery of the reactor core 14, which is formed by the plurality of fuel assemblies 16 being arrayed therein. The baffle assembly 20 surrounds the fuel assemblies 16 of the reactor core 14, as shown in FIG. 2A. Specifically, the baffle assembly 20 includes a plurality of substantially vertical segments or plates, such as the A segments 26, B segments 28, C segments 30, D plates 32 and angle plates 34, shown in FIGS. 2A and 2B, which are fastened to generally horizontal former plates 35 by bolts 36. The baffle plate-to-former arrangement and fasteners (e.g., bolts) therefor, are described in further detail, for example, in U.S. Pat. Nos. 4,080,257 (Marhado et al.) and 6,055,288 (Schwirian), which are hereby incorporated herein by reference.

Referring again to FIG. 1, the upper end of the reactor pressure vessel 12 is hermetically sealed by a removable closure head 38 upon which are mounted a plurality of control rod drive mechanisms 40. For simplicity of disclosure and ease of illustration, only a few of the many control rod drive mechanisms 40 are shown. Each control rod drive mechanism 40 selectively positions a corresponding rod cluster control mechanism 42 above and within some of the fuel assemblies 16. A nuclear fission process carried out in the fuel assemblies 16 of the reactor core 14 produces heat which is removed during operation of the PWR 10 by circulating a coolant fluid (e.g., without limitation, light water with soluble boron), through the core 14. More specifically, the coolant fluid is typically pumped into the reactor pressure vessel 12 through a plurality of inlet nozzles 44 (only one inlet nozzle 44 is shown in FIG. 1). As indicated generally by the arrows at FIG. 1, the coolant fluid passes downward through an annular region 46 defined between the reactor vessel 12 and core barrel 18, and a thermal shield 48 on the core barrel 18, until it reaches the bottom of the reactor vessel 12 where it turns 180 degrees prior to flowing up through the lower core plate 24 and then up through the reactor core 14. Upon flowing upwardly through the fuel assemblies 16 of the reactor core 14, the coolant fluid is heated to reactor operating temperatures by the transfer of heat energy from the fuel assemblies 16 to the fluid. The hot coolant fluid then exits the reactor vessel 12 through a plurality of outlet nozzles 50 (only one outlet nozzle 50 is shown in FIG. 1) extending through the core barrel 18. Thus, heat energy which the fuel assemblies 16 impart to the coolant fluid is carried off by the fluid from the pressure vessel 12.

2-Loop Example

When it is time to replace reactor internals such as, for example and without limitation, the lower core barrel assembly 52 of FIGS. 1, 2A and 2B, it is necessary to dispose of the internals, which are highly irradiated (e.g., about 500,000 R/hr on contact), in a shielding container or cask. In order to minimize the radiation dose level on the outer surface of the shielding cask which contains the old internals, the wall of the cask, which typically comprises a carbon steel cylinder, can reach a thickness of about 11 inches to about 13 inches, depending on the size of the plant and the operating life of the core structures being replaced.

Figure 7:
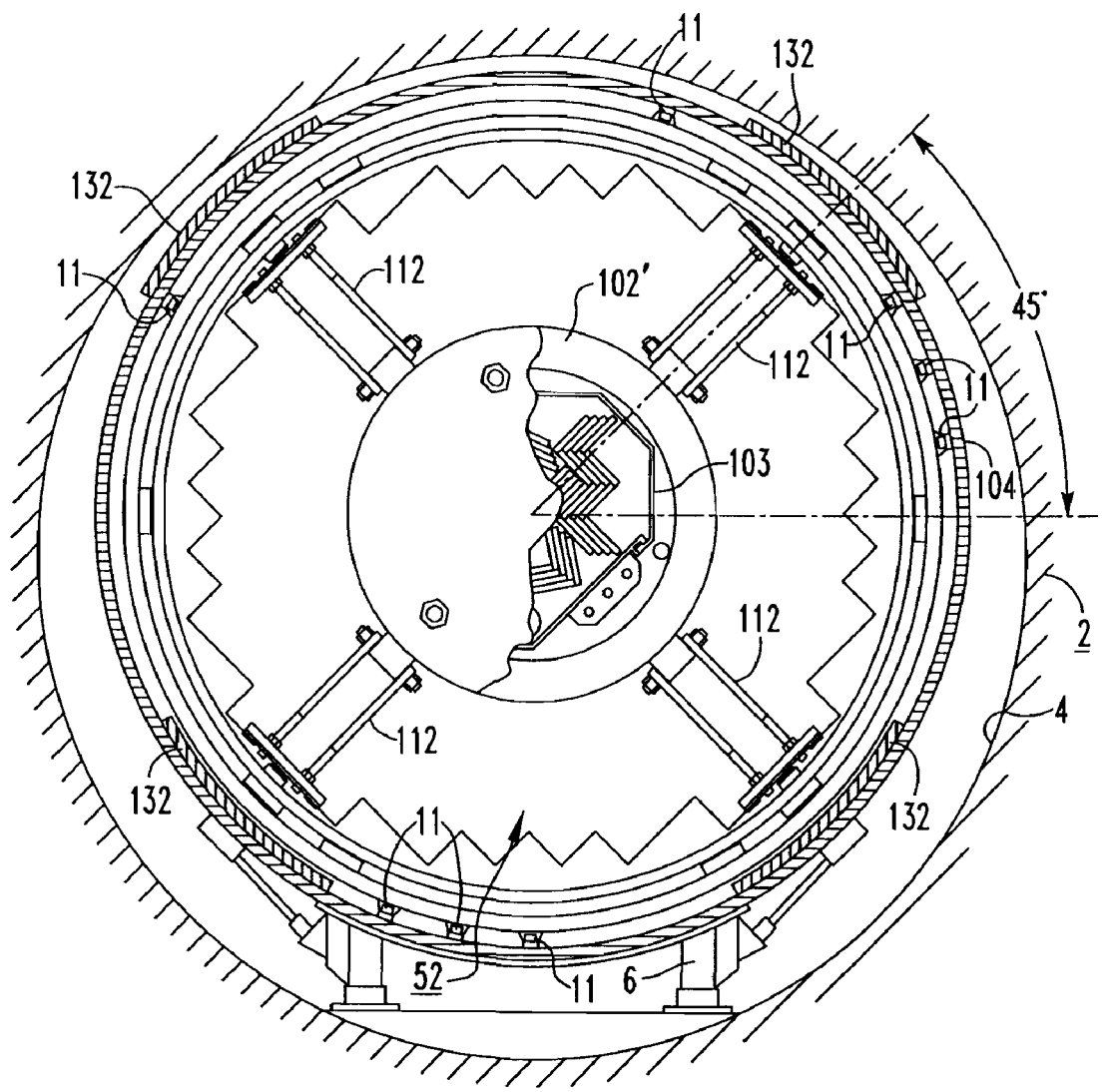
FIG. 7 is an end elevation, partly in section view of the cask-in-cask assembly of FIG. 6 shown loaded on a transfer skid for transport thereof, passing through the equipment hatch.
Figure 8:
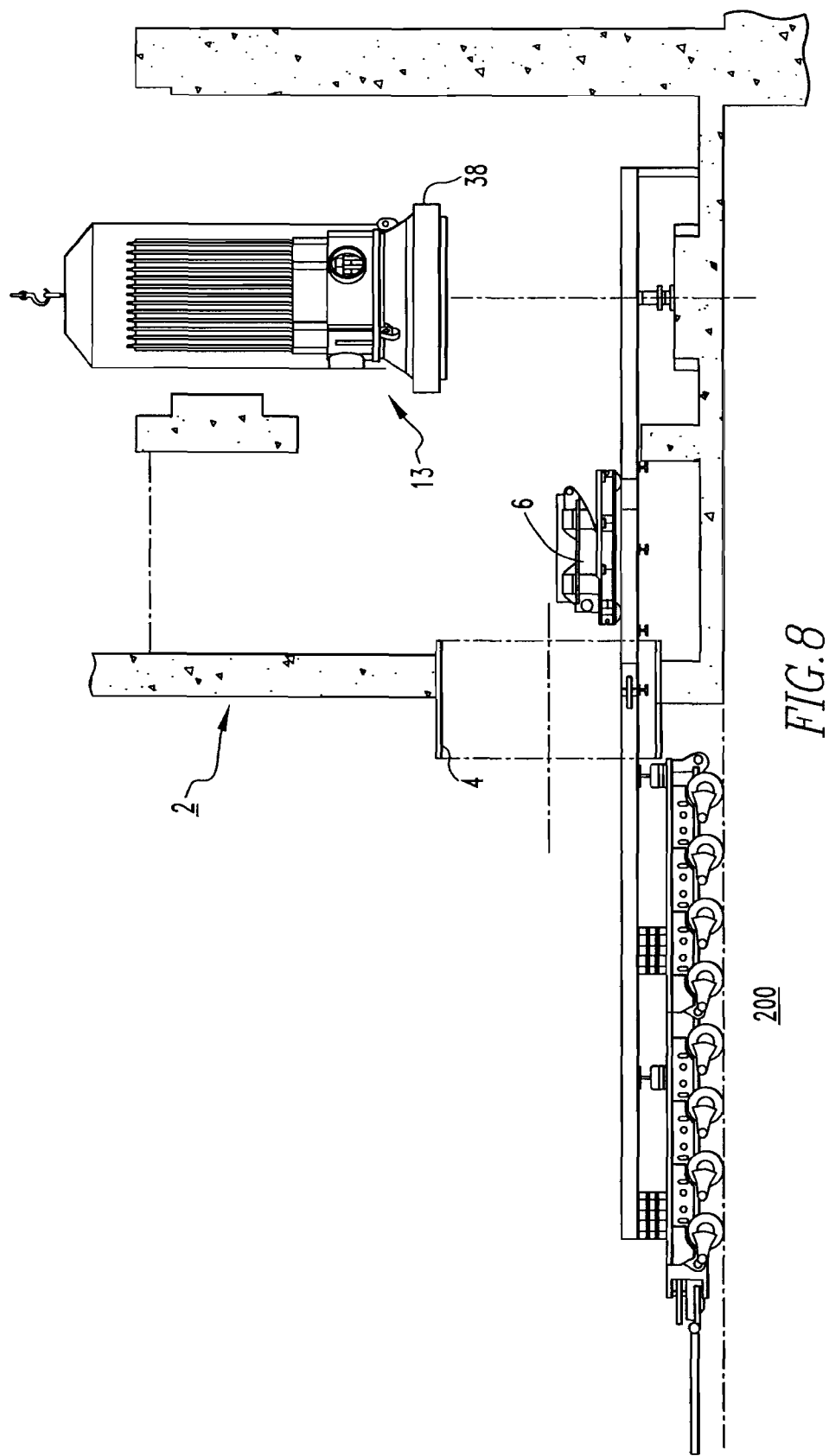
FIG. 8 is a side elevation view of a portion of the reactor containment building and an equipment hatch therefor, with a rail and truck system for facilitating movement of the cask-in-cask assembly of FIG. 7 through the equipment hatch, also showing a replacement pressure vessel head assembly after being transported through the equipment hatch and up-ended.

In recent offshore programs, 2-loop size reactor internals were casked and removed, without being first dismantled, from the reactor containment building (see, for example, containment vessel (e.g., building) 2 of FIGS. 7 and 8) through the existing relatively large (e.g., about 252 inch diameter) equipment hatch opening. The shielding cask wall thickness was about 11 inches, and the loaded cask was about 41 feet long and weighed about 550 tons. In many circumstances, the equipment hatch will not be large enough for a single shielding cask which provides the necessary shielding attributes. Under such circumstances, a larger hole will have to be made in the containment building, and specialized equipment (e.g., heavy duty cranes) capable of lifting the huge cask will be necessary, as previously discussed.

On a 2-loop plant with about 30 calendar years of operation (e.g., 24 effective full-power years), the following contact radiation readings were measured on the following components:

| 1. | Baffle Plates (Core Side) | ~500,000 R/hr. |
|---|---|---|
| 2. | Core Barrel. O.D. | ~100,000 R/hr. |
| 3. | Thermal Shield, I.D. | ~40,000 R/hr. |
| 4. | Thermal Shield. O.D. | ~6,000 R/hr. |
| 5. | Lower core Plate | ~100,000 R/hr. |

The radiation level requirement for the outer diameter (O.D.) surface of the shielding cask is about 200 mR/hr. for over the road shipment (higher if the cask is stored on-site). Hence, the aforementioned 11 inch wall thickness is required, if the load is shipped. As will now be described, the invention provides an improved method for providing the requisite shielding, while simultaneously reducing the size and weight of the casked load. It will be appreciated that first casks 102 and 102' represent two non-limiting alternative example embodiments of inner casks in accordance with the invention.

Multiple Casks and an Organized Load

Specially, as will be described herein, the disclosed method removes the highly irradiated baffle plates and/or segments 26,28,30,32,34 (FIGS. 2A-5) and disposes of them separately, positioned them within a novel first or inner cask 102 (FIGS. 4B-6 and 17A), 102' (FIGS. 3, 7 and 16) which is spaced apart from the inside diameter of a second or outer shielding cask 104 to achieve the desired shielding in a compact configuration. It will be appreciated that first casks 102 and 102' represent two non-limiting alternative example embodiments of inner casks in accordance with the invention. The baffle plates and/or segments 26,28,30,32,34 are dismantled by removing as few retaining bolts 36,36' (FIG. 2B) as possible and securing the baffle plates and/or segments 26,28,30,32,34 within the individual inner shielding cask 102,102', in an organized, compact array. In turn, the inner cask 102,102' is stored, in a compact fashion, inside the internals (e.g., lower core barrel assembly 52).

FIG. 2B illustrates a typical baffle plate-to-former bolting arrangement of the baffle assembly 20. Specifically, a plurality of bolts 36 couple the baffle plates and/or segments (a B segment 28, a D plate 32, and an angle plate 34 are shown in FIG. 2B) to former plates 35. As shown in FIG. 2C, the bolts 36 may be secured by lock bars 37 (one is shown) welded to the baffle plates 28.

FIG. 3 shows all the baffle plates and/or segments 26,28, 30,32,34 having between removed (e.g., unbolted) and stacked inside a remnant canister 103, which is generally octagonal in shape. The canister 103 and baffle plates and/or segments 26,28,30,32,34 therein, are then disposed within the inner cylindrical cask 102'. The inner cask 102' has a wall thickness 116' of about 7.5 inches. A receptacle 124' is included within the remnant canister 103 for receiving the bolts 36,36' of the baffle assembly 20 (FIGS. 1, 2A and 2B).

FIGS. 4A-6 and 11A-16 show another method and configuration for securing the baffle plates and/or segments 26,28,30,32,34 in an inner cask 102 which, unlike the cylindrical cask 102' of FIGS. 3, 7 and 16, is preferably generally octagonal in shape. More specifically, the inner cask 102 includes a base plate member 106 which is structured to be disposed on the lower core plate 24 (FIG. 1) which, in turn, bears the vertical load component of the cask 102. In particular, the inner cask 102 is disposed on the axial center line of the lower core plate 24, thereby positioning the highly irradiated baffle plates 26,28,30,32,34 well away from the cylindrical outer cask 102 (FIGS. 5-7) which shrouds the entire lower internals 52. This separation, and the wall thickness 116 of the inner cask 102, which is preferably about 7.5 inches, provides the requisite level of radiation shielding while simultaneously allowing for a relatively thin-walled outer cask 104 in comparison with the aforementioned example, which was about 11 inches thick. As a result, cost, size and weight savings are realized. Furthermore, as will be described hereinbelow, the baffle plates and/or segments 26,28,30,32,34 are preferably secured in an organized manner within a racking assembly 130, as shown in FIGS. 4A and 4B, in order to maximize the efficiency with which the interior space of the inner cask 102 is used, and thereby minimize the overall size of the inner cask 102. It will be appreciated that the casks 102, 102' may have a wall or walls which are detachable or otherwise removable from the cask base plate member 106, in order to facilitate the process of the loading the racking assembly 130 of the cask 102,102'.

Figure 5:
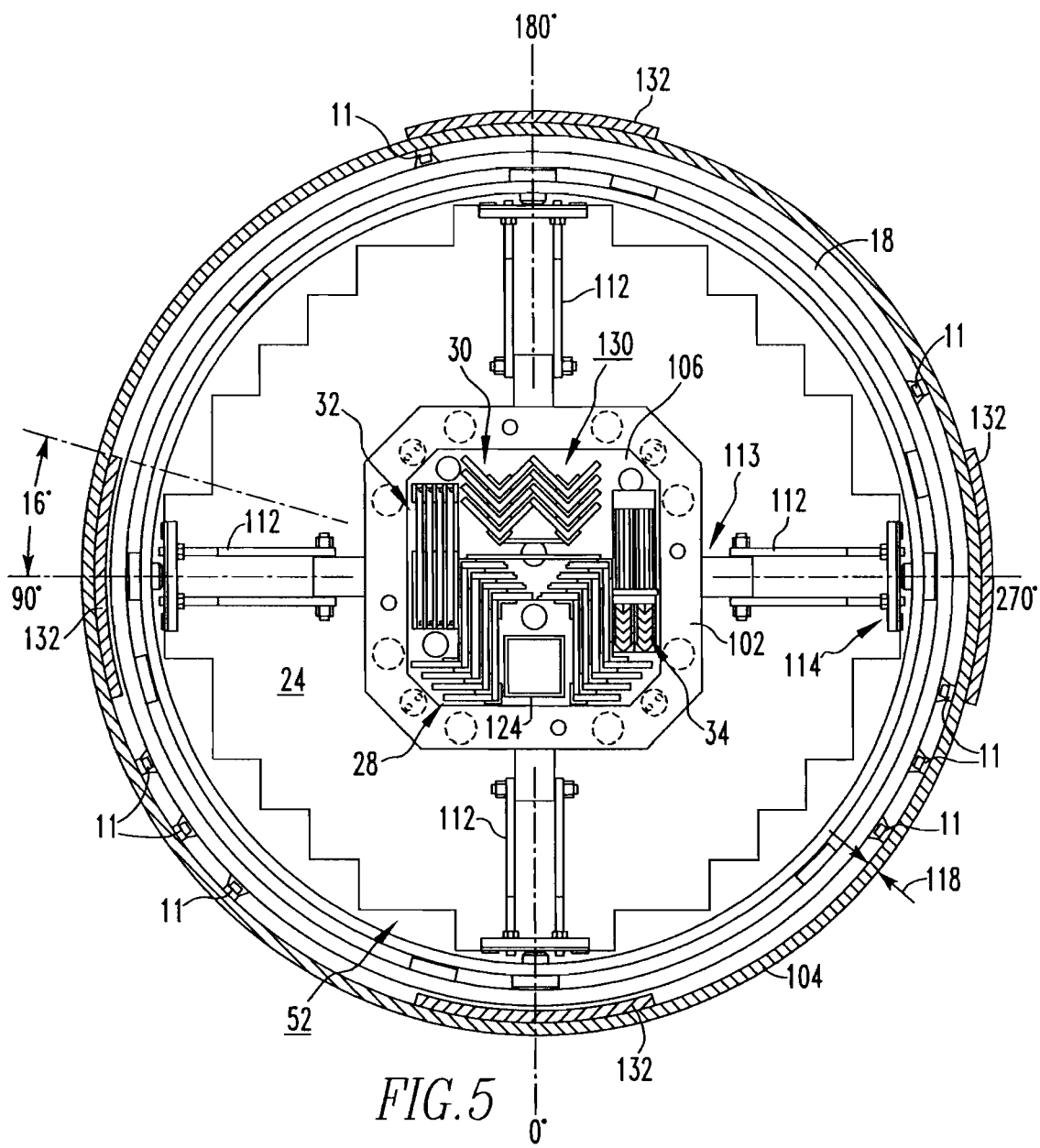
FIG. 5 is a top plan view of the generally octagonal cask of FIG. 4B, shown secured within the lower internals of the core using radial arms, all within an outer cylindrical cask, in accordance with an embodiment of the invention.

FIG. 5 shows the generally octagonal inner cask 102, located in the lower internals 52, as described, with radial arms 112 (four are shown) deployed to stabilize the inner cask 102, and to absorb horizontal loads during the process of lifting, lowering, and moving out of the reactor containment vessel (e.g., containment building 2 of FIG. 8). These radial arms 112 have a first end 113 disposed at or about the outside of the cask 102, and a second end 114 which extends outwardly to engage the internals 52 and secure the inner cask 102 in a centralized position therein. It will be appreciated that such arms 112 may be disposed at two or three vertical levels (see, for example, arms 112 disposed at three vertical levels in FIG. 17A) in order to fully secure the inner cask 102.

Accordingly, by way of example, with the baffle plates 26,28,30,32,34 relocated to the center of the core barrel 18, the shielding wall thickness 118 (FIG. 5) required, for example, for a cask having an outer diameter (O.D.) of about 157 inches, is only about 2.00 inches (about 3 inches locally). As shown in FIG. 5, additional panels which are about 1.00 inch thick, are preferably coupled to the cask 104 at or about the cardinal axes (e.g., 0, 90°, 180°, 270°) of the internals 52, where radiation levels are generally much higher than that of the 45° axes.

Figure 6:
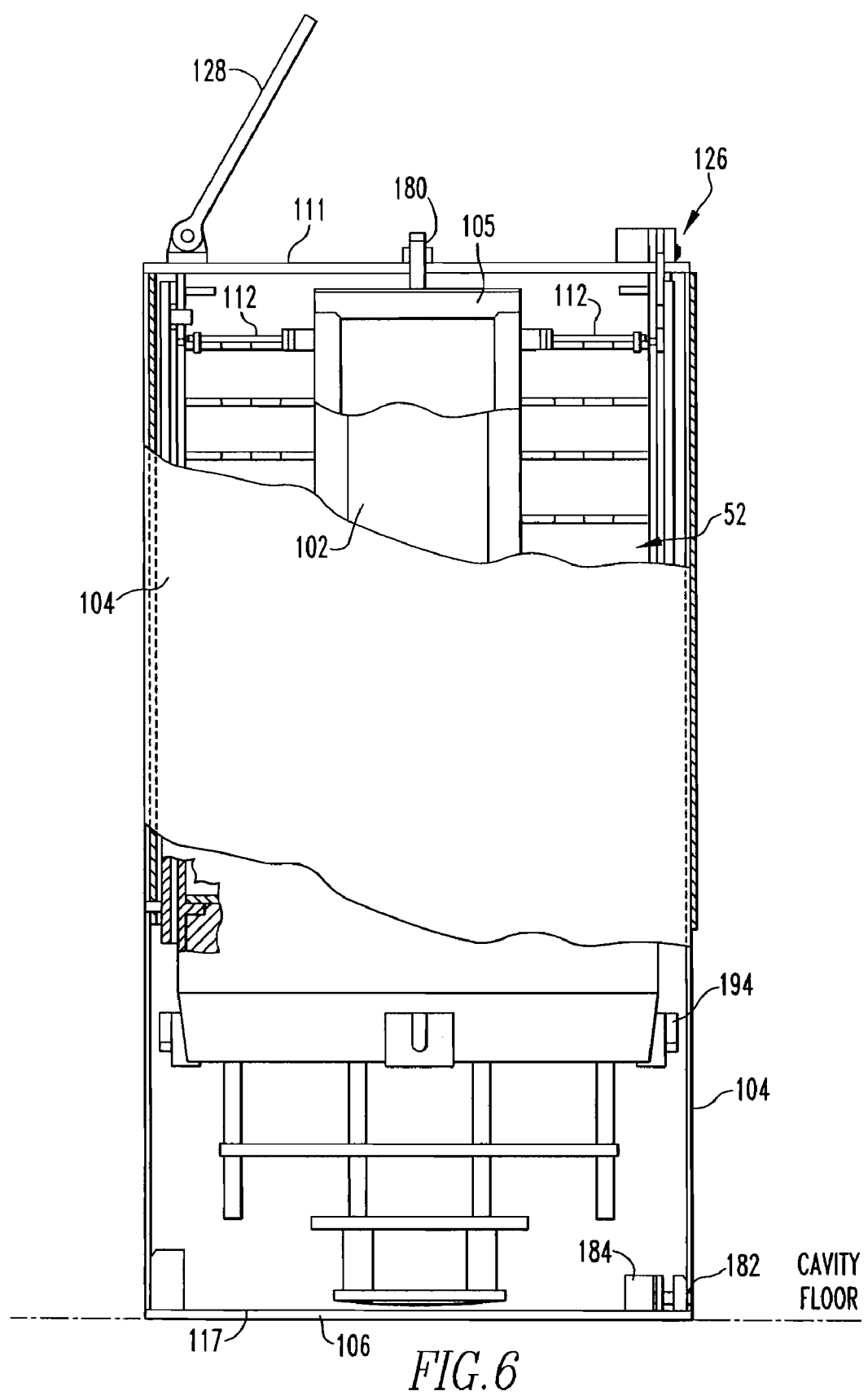
FIG. 6 is a side elevation, partly in section view of FIG. 5, modified to also show the top cover of the cask and showing a portion of a lift rig assembly for lifting the casks, in accordance with an embodiment of the invention.

The casked lower internals 52 culminates in what can be seen in FIG. 6, where the lower internals section 52 is within the outer cask 104 with top and bottom cask covers 105,106 in place, and the lift rig 126 (best shown in FIGS. 17A-17C) is assembled. This casked assembly will then be transported out of the reactor containment building 2, as shown in FIGS. 7 and 8. Specifically, the casked assembly is much smaller and lighter than would otherwise be necessary if a single cask were employed. The overall dimensions of the exemplary assembly are about 160 inches in maximum outer diameter (O.D.) and about 305 inches in length. The weight of the assembly is about 225 tons. Accordingly, such load can be handled using, for example, tie rods 128, and the on-site main crane (not shown) with modest motor and cable upgrades, and the addition of several vertical crane rail supports. Such modifications are common in the industry, making the disclosed method a very cost effective solution.

Additionally, whereas many 2-loop plants have relatively large equipment hatch openings in the reactor containment structure, such as the 252 inch diameter hatch, in the 2-loop example previously discussed, most 3-loop plants feature openings of only about 176 inch in outer diameter (O.D.). As shown in FIG. 7, the 160 inch O.D. of the casked assembly in accordance with the invention will fit through such 176 inch equipment hatch 4. Specifically, FIG. 7 shows the 225 ton casked assembly loaded onto a transfer skid 6 and being moved through the equipment hatch 4. In the example of FIG. 7, the inner cask 102' is of the generally cylindrical configuration described hereinabove with respect to FIG. 3. In this non-limiting example, which is representative of, for example and without limitation, Surry Unit 2, a clearance of about 2 inches is present at the top of the assembly, between the outer cask 104 and the hatch 4. FIG. 8 is provided for reference to show the type of "rail and truck" system 200 that is generally installed to facilitate movement of equipment through the equipment hatch 4. A pressure vessel head assembly 13 is shown, already through the hatch 4 and upended for transport to the pressure vessel 12 (FIG. 1).

As previously discussed, if the outer cask 104 were larger, it would be necessary to create a larger opening by breaking through concrete and rebar of the containment building 2, and then restore the building 2 after the job was completed. Several plants have done this, out of necessity, for example, when changing out steam generators or pressure vessel head assemblies (see, for example, head assembly 13 of FIG. 8). Obviously, this option undesirably entails a significant added cost and additional plant outage time.

EXAMPLE METHOD

Figure 9A:
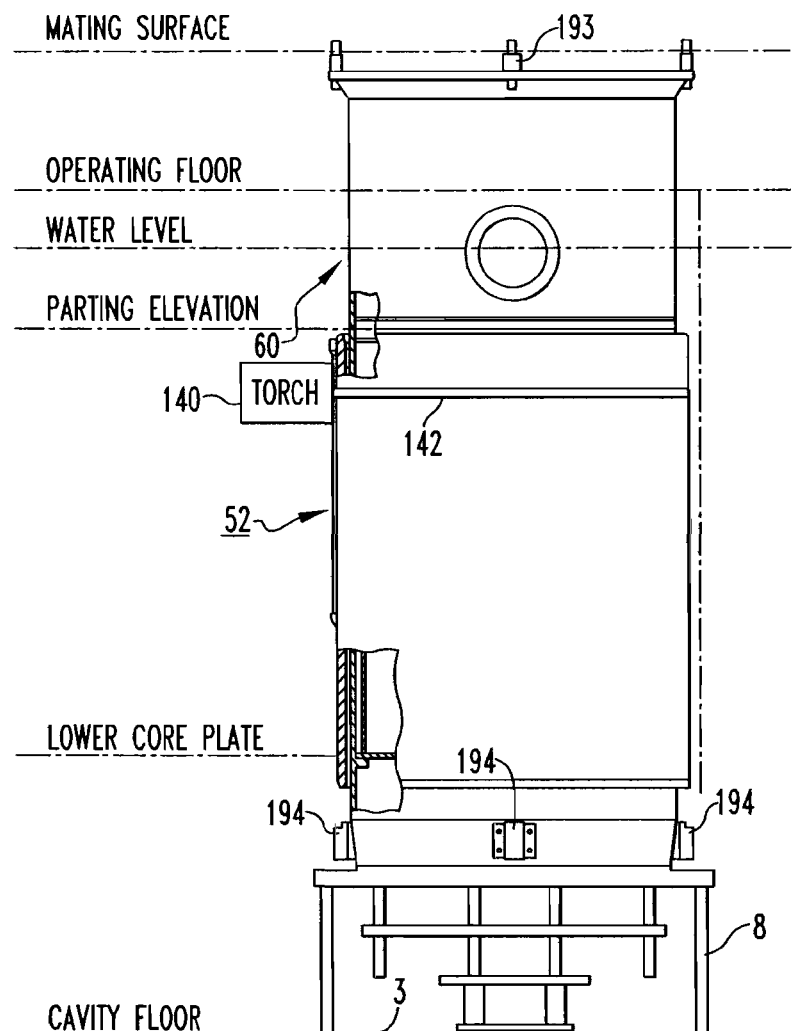
FIG. 9A is a side elevation, partly in section view of a storage stand with the lower internals of the core residing therein.
Figure 9B:
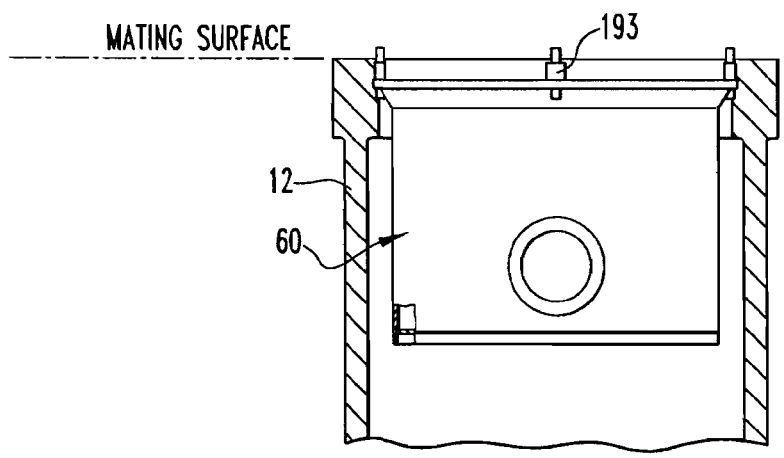
FIG. 9B is a side elevation, partly in section view of the upper section of the core barrel of FIG. 9A after being severed in accordance with an embodiment of the invention, temporarily deposited in the pressure vessel.
Figure 9C:
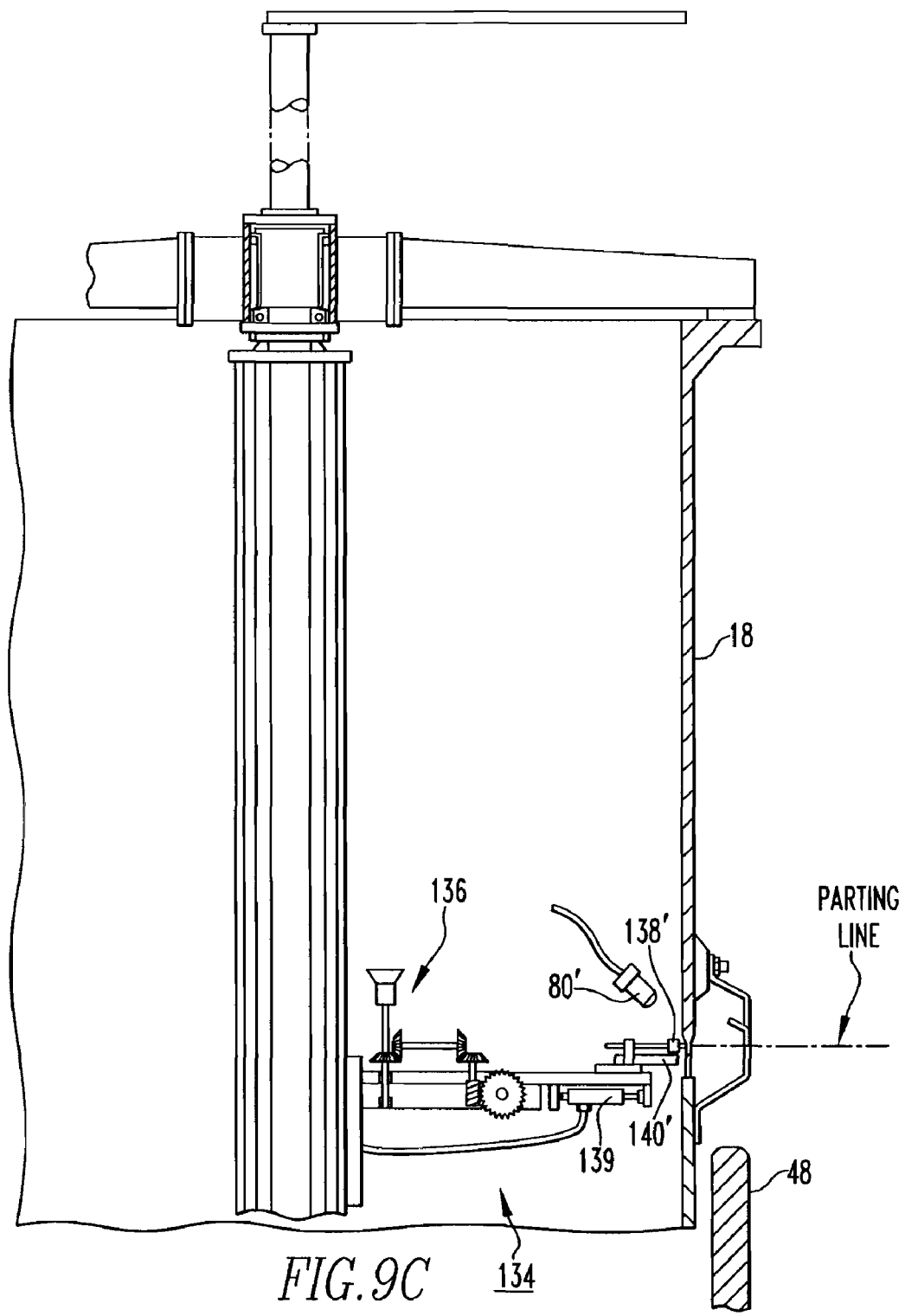
FIG. 9C is a side elevation, partly in section view of a cutting tool for cutting the core barrel from within, in accordance with an embodiment of the invention.

A non-limiting EXAMPLE of an operation employing the method of the invention will now be discussed. Specifically, FIG. 9A shows the lower internals 52 residing in its storage stand 8 after the core barrel 18 has been removed from the pressure vessel 12. A number of head and vessel alignment pins 193 are provided at the mating surface. At an elevation of about 290 inches above the reactor cavity floor 3, the core barrel 18 is parted using a plasma torch 140 (shown in simplified form) mounted, for example, on a track assembly 142 such as, for example and without limitation, a BUGO TRACK®, which is affixed by clamps or suction cups to either the core barrel 18 or thermal shield outer diameter. A BUGO TRACK® is commercially available from BUG-O Systems, Inc. which has a place of business in Pittsburg, Pa. The torch 140 will track around the circumference of the core barrel 18 (a distance of about 430 inches), thereby severing the upper section 60. Depending on each specific plant layout, cutting can be performed from without (FIG. 9A) or within (FIG. 9C) the core barrel 18. For example, FIG. 9C shows an alternative embodiment in which a tool 134 having a plurality of gears 136 and a stylus 138, is employed to cut the core barrel 18 from inside. Specifically, an air cylinder 139 marks in conjunction with the gears 136 and stylus 138 to position the torch 140' in the desired location and move it to cut the core barrel 18. A television camera 80' can be employed to monitor the operation. The upper section 60 (see also FIG. 9B) can then be transported to, and inserted into the pressure vessel 12, sans the lower section 52, which remains in the storage stand 8. Removal of the aforementioned baffle plates and/or segments 26,28,30,32,34 is then commenced.

Specifically, the underwater operation of removing the bolts 36 which fasten the baffle plates and/or segments 26,28, 30,32,34 to the formers 35, and baffle-to-baffle edge bolts 36' (FIG. 2B), will now be described. Referring back to FIG. 2B, and the example of a 3-loop plant, there are a total of about 1,088 baffle-to-former bolts 36, and about 1800 baffle edge bolts 36'. In accordance with the exemplary method, all of the baffle-to-former bolts 36 are removed, and only about 408 baffle edge bolts 36' need to be removed. More specifically, by selective removal of edge bolts 36', baffle plate segments, such as segments A, B, and C previously discussed, rather than individual plates 26,28,30 can, in most cases, be removed. There are, in addition four of the aforementioned D plates 32, and eight corner angle plates 34. As shown in FIG. 2C, and as previously discussed, the bolts 36 are secured with lock bars 37. The lock bars 37 fit into a slot in the bolt head, as shown, and after the bolts 36 are torqued, a weld is added at each end of the lock bar 37 to secure it to the counter bore of the bolt 36 (see also FIG. 2B). A novel bolt removal tool 56, which is shown in simplified form in FIG. 10 and is described below with respect thereto, is provided to accomplish the tasks of loosening and removing select bolts 36.

Figure 10:
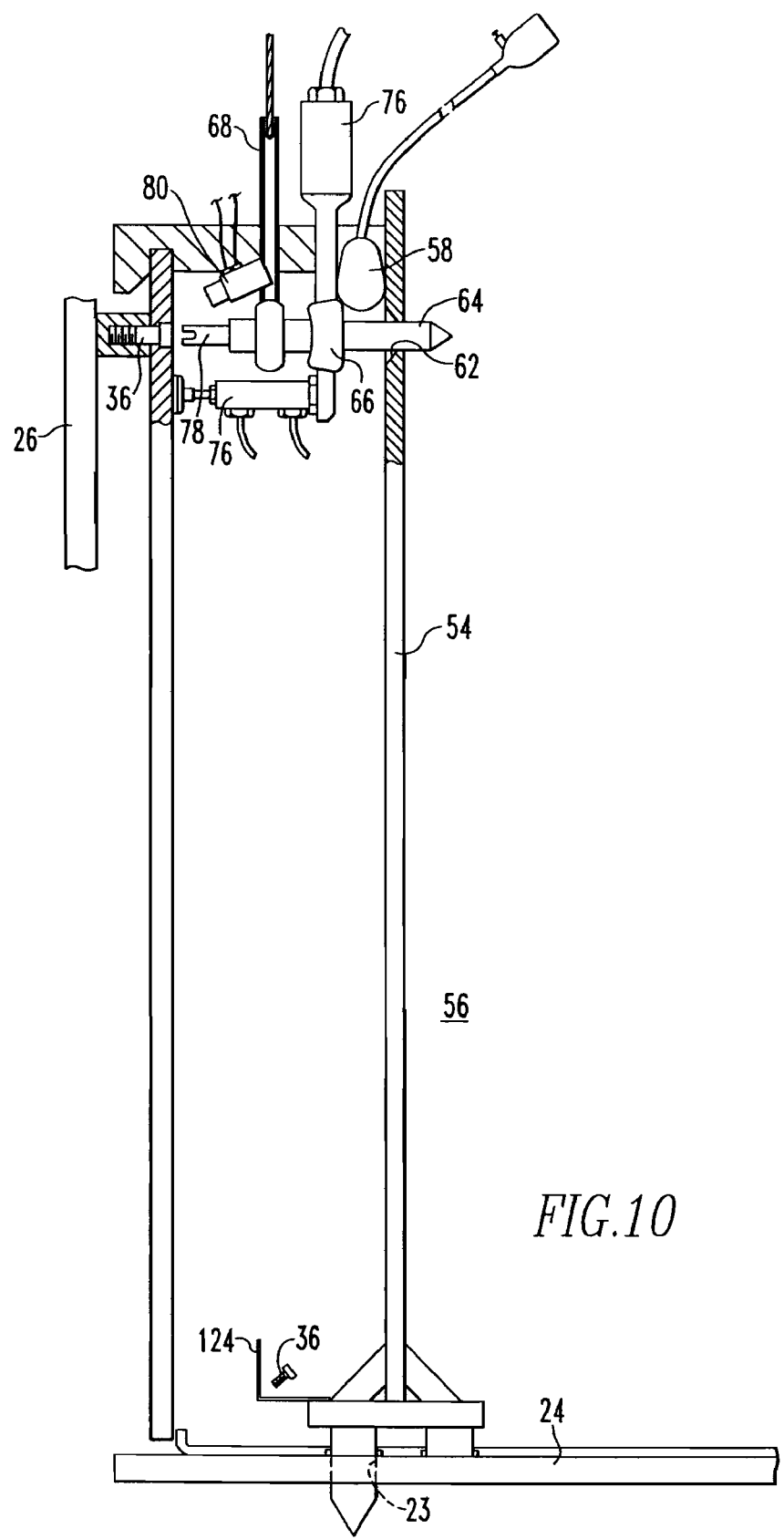
FIG. 10 is a side elevation view of a bolt removal tooling assembly for removing bolts of the baffle assembly, in accordance with an embodiment of the invention.

Specifically, two such tools 56 (one is shown in FIG. 10) will be deployed in the baffle cavity (see FIGS. 1 and 2A), and spaced approximately 180 degrees apart from one another. In this manner, the tools 56 may work simultaneously in order to reduce plant outage time for the operation. As shown in FIG. 10, the exemplary tool 56 includes a strong back 54, which preferably keys into precise holes 23 in the lower core plate 24 (partially shown in simplified form in FIG. 10), and can be positioned to address every bolt 36, in every baffle plate and/or segment (an A baffle segment 26 is shown in FIG. 10). The strong back 54 is essentially a template which has a hole 62 for receiving a pilot (i.e., guide) pin 64 which is disposed on a torquing drive 66. More specifically, it is believed that the weld of lock bar 27 (FIG. 2C) can be broken with sufficient torque being applied with a breaker bar 68 (fitted with a socket head cap screw ejector in the example shown), and then the bolt 36 unscrewed with a nut runner 76 (e.g., a device for twisting a nut to loosen or tighten it) that is coupled to, and designed to rotate, a suitable wrench, such as the modified Allen wrench 78, both of which are shown in simplified form in FIG. 10. An air cylinder 76 can then be employed to retract the wrench 78 and draw out the loosened bolt 36 to be deposited into a chute (not shown) for disposal in the aforementioned receptacle 124 (shown in simplified form in FIG. 10; see also FIGS. 4A-5 and 11A). In the example of FIG. 10, a television camera 80 is positioned to monitor the operation.

The exemplary tool 56 also includes a pneumatic cavity 58, as defined herein. The pneumatic cavity 58 which can comprise, for example and without limitation, an inflatable bladder 58 of the type generally shown in FIG. 10, is inflated pneumatically to ease the modified Allen wrench 78 into engagement with the head of the bolt 36. The Allen wrench 78 is shown spaced from the head of the bolt 36 in FIG. 10. It will, of course, be appreciated that additional equipment such as, for example and without limitation, lighting fixtures (not shown) and vacuum equipment (not shown), could be provided in order that the operation can be observed from a work platform or other suitable location, for example, positioned above the water level (see, for example, FIG. 9A).

There are eight levels (e.g., in elevation) of formers 35 that must be addressed. The strong back 54, which also serves as a template, is designed to span two or perhaps three bolts 36 laterally, per setup of the tool 56. Thus, about 26 lateral moves, total, of each strong back setup 54, with an average of, for example and without limitation, about 18 minutes being spent to remove each bolt 36, is anticipated for the disassembly process. This includes movement of the torquing tool 66, but not movements of the strong backs 54. About 104 hours will be allotted for repositioning the strong back 54. In summary, the aforementioned tool 56 and method provide for efficient disassembly of the baffle assembly 20 (FIGS. 1, 2A and 2B) in to the desired plates and/or segments. As a result, minimal plant down time is achieved.

It will be appreciated that various alternative to the aforementioned tool 56 and associated method for removing bolts 36, could be employed without departing from the scope of the invention. For example and without limitation, an alternative to breaking the welds lock bars 27 with just torque, would be to use a saw (not shown), for example, of the type commonly referred to as a "hole saw," or any other known or suitable cutting device (not shown). Such saw could be, but need not necessarily be, an integral part of the untorquing tool 66, and be employed to first cut the welds and thereby reduce the amount of torque needed to undo the bolt 36. Additionally, in the unlikely event that the threads of the bolt 36 were to gall, a boring tool (not shown) could be attached to the torquing device and the bolt head could be removed, leaving the threaded end in the former 35.

In the next step, once the baffle plates and/or segments 26,28,30,32,34 are uncoupled from the formers 35, they are transported to the center of the lower core plate 24 and positioned into the appropriate "niche" or rack of the aforementioned racking assembly 130 for storage within the inner cask 102, as shown in FIG. 4B. Specifically, the racking assembly 130 (FIGS. 4A-5 and 11A) includes a plurality of storage racks 144,146,148, which are an integral part of the inner cask base plate 106, and are structured to receive and secure the various plates and/or segments 26,28,30,32,34 in an organized array within the inner cask 102, as shown in FIG. 4B.

Figure 11A:
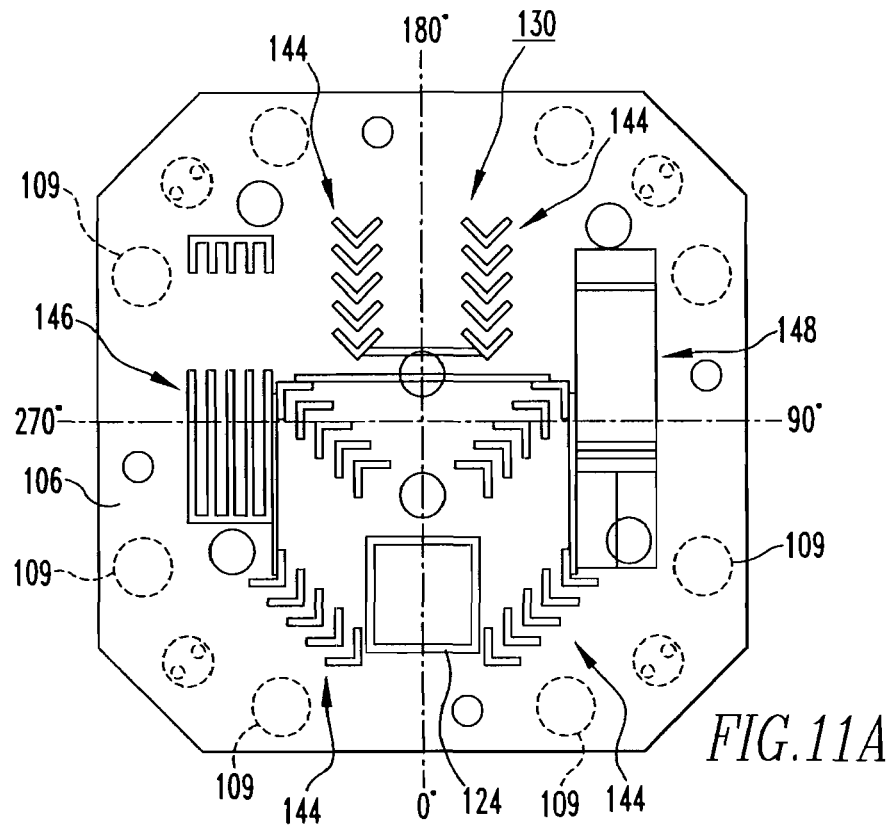
FIG. 11A is a top plan view of the base plate of the generally octagonal cask and racking assembly therefor of FIG. 4A, prior to the baffle plates and segments being disposed therein.
Figure 11B:
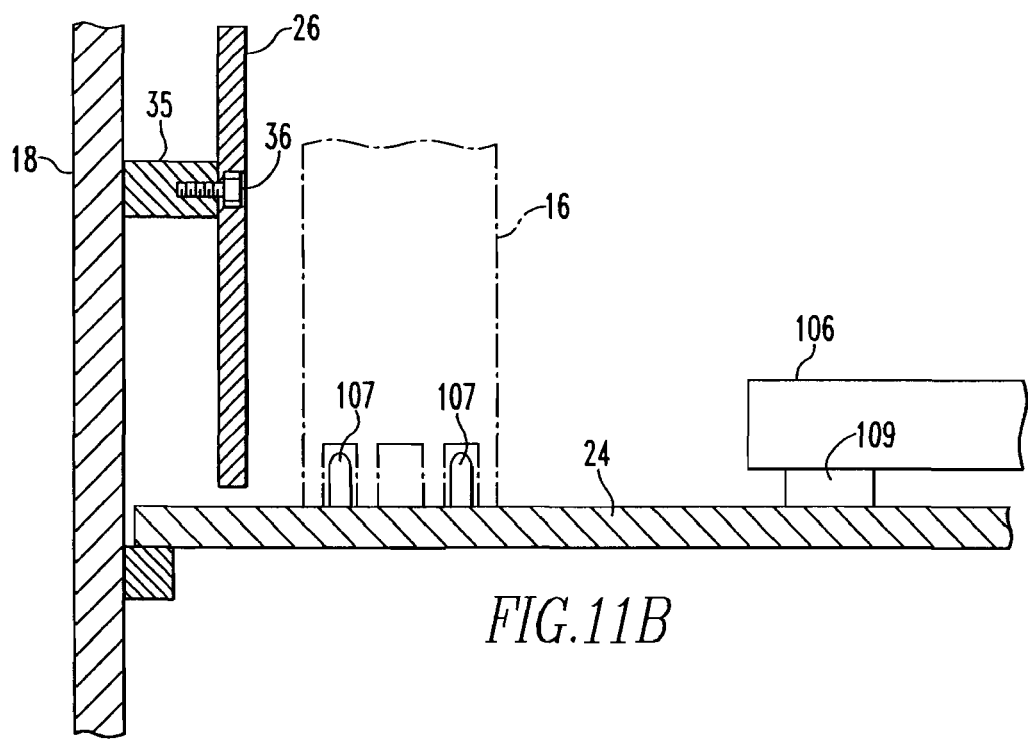
FIG. 11B is a side elevation view of the base plate of FIG. 11A positioned in the center of the lower core plate (partially shown) and partially showing one fuel assembly in phantom line drawing.

More specifically, FIGS. 11A and 11B show the base plate member 106 (partially shown in FIG. 11B) for the inner cask 102 (FIGS. 4B-6 and 17A). As previously discussed, it is positioned in the center of the lower core plate 24 (FIG. 5). Specifically, precisely located pins 107 are permanently installed on the lower core plate 24 (FIG. 11B) and are structured to be received in the recesses of the base of fuel assemblies 16 (one fuel assembly is shown in phantom line drawing in FIG. 11B). A number of guide members 109 (e.g., protrusions 109) (best shown in FIG. 11B) are included on the base plate member 106 and are structured to engage the lower core plate 24 and maintain it in the desired centralized position thereon. This engagement also provides lateral restraint for the base plate 106. For example, there are about 314 pins 107 affixed to the lower core plate 24 in the aforementioned EXAMPLE. FIG. 11A also shows the racks 114,146,148, some of which comprise angle plate weldments affixed to the base plate member 106, for positioning and restraining the baffle pate segments 26,28,30 (FIGS. 4A and 4B) and individual plates 32 (FIGS. 4A and 4B) as they are moved into their storage positions. The segments 26,28,30 and plates 32 must be laterally transported to this position, for example, by a suitable clamping tool (not shown) suspended from the on-site crane (not shown). The baffles cannot be lifted substantially because they must remain well below the water level for adequate shielding. FIGS. 4A and 4B show the racks 144,146,148 of the racking assembly 130 fully loaded.

FIGS. 14A through 15C show the storage racks 114,146, 148 of the exemplary racking assembly 130 in greater detail. Specifically, FIGS. 12A and 12B show top plan and side elevation views, respectively, of the storage rack 144 for A plate segments 26 (FIGS. 4A and 4B) of the disassembled baffle assembly 20 (FIGS. 1, 2A and 2B). The rack 144 generally comprises four relatively long (e.g., without limitation, about 144inches) angle racks 150 which extend perpendicularly outwardly from the base plate member 106, and are joined by three cross members 152, for structural support. A plurality of shorter (e.g., without limitation, about 24 inches) angle racks 154 also extend outwardly from the base plate member 106 and are in staggered relation with respect to one another, as shown. In this manner, the rack 144 receives A plates segments 26 in the side-by-side arrangement shown in FIGS. 4A and 4B. The aforementioned receptacle 124 (e.g., box) for receiving bolts, is also shown. It will be appreciated that while one receptacle 124, which is generally square in shape, is shown, that any suitable number and/or configuration of receptacles could be employed. It will also be appreciated that the same is true with respect to the number and configuration of the angle members 150,154 and cross supports 152 of the rack 144, and with respect to the racks 146,148 and components thereof, discussed hereinbelow.

FIGS. 13A-13C shows the storage rack 144 of the racking assembly 30 for receiving and securing C plate segments 30 in the manner shown in FIGS. 4A and 4B. Two relatively long (e.g., without limitation, 144 inches) angles 150 extend perpendicularly outwardly from the base plate member 106 and are joined by cross support 152. A plurality (e.g., without limitation, eight are shown) of shorter (e.g., without limitation, 24 inches) angles 154 are aligned with respect to angles 150, in parallel rows, as shown.

FIGS. 14A-14C show a top plan and two-side elevation views, respectively, of the rack 146 of racking assembly 130 for receiving and securing D plates 32, in the manner shown in FIGS. 4A and 4B. Specifically, the rack 146 includes a first, relatively long (e.g., without limitation, 144 inches) racking element which extends perpendicularly outwardly from the base plate member 106 and includes a plurality (e.g., without limitation, five are shown) of parallel fins 160. A second, relatively short (e.g., without limitation, 24 inches) racking element 158 is disposed opposite and spaced from the first racking element 156, as shown. The second racking element 158 includes a corresponding number of parallel fins 162, which align with the fins 160 of the first racking element 156. In this manner, the first and second racking elements 156,158 receive opposing ends of the D planes 32 between adjacent pairs of fins 160,162, as shown in FIGS. 4A and 4B.

FIGS. 15A-15C show a top plan view and two side elevation views, respectively, of a portion of the base plate member 106 and racking assembly 130 therefor, including storage rack 148, which is structured to receive and secure the corner angles or angle plates 34 (FIGS. 2B, 3, 4A and 4B) of the disassembled baffle assembly 20 (FIGS. 1, 2A and 2B), in the manner shown in FIGS. 4A and 4B. The exemplary rack 148 includes a generally rectangular (from a top plan perspective) receiving portion 164 which, as best shown in the side elevation view of FIG. 15C, comprises a receiving member 166 that is tilted or angled with respect to the base plate member 106 at an angle of, for example and without limitation, about 7 degrees from vertical. The upper (from the perspective of FIGS. 15B and 15C) end of the tilted member 166 includes a retaining member, such as the hinged retaining member 168 which pivotably coupled to tilted member 166 in the example of FIG. 15C. Accordingly, the receiving portion 164 and tilted member 166 thereof, of the storage rack 148, receive the corner plates 34 on an angle, with the upper ends of the corner plates 34 being secured beneath the retaining member 168, as shown in FIGS. 4A and 4B.

Figure 16A:
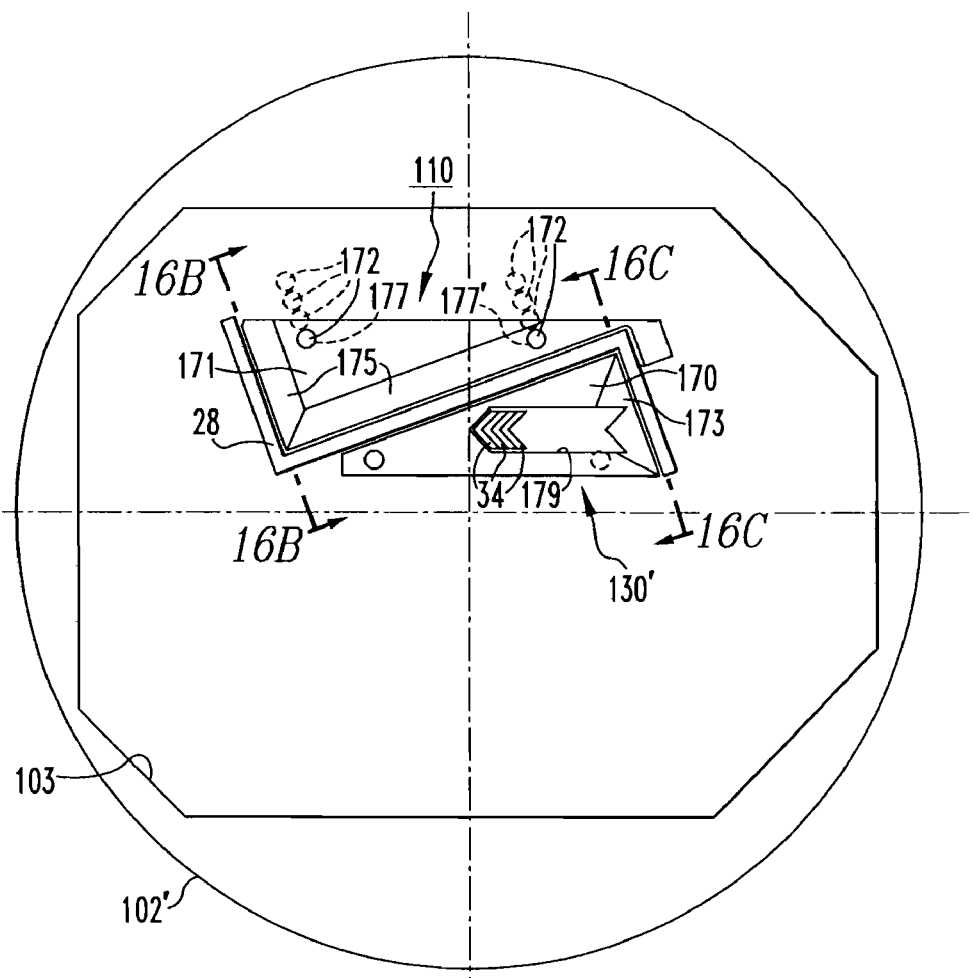
FIG. 16 is a top plan, simplified view of a guidance device for guiding baffle plates and segments into the racking assembly of FIG. 11A, in accordance with an embodiment of the invention.
Figure 16B:
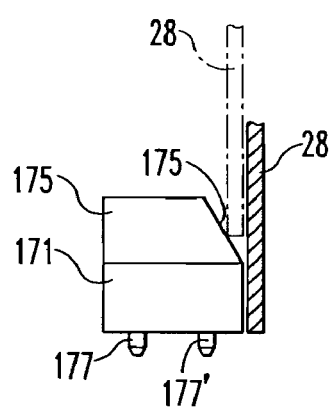
Figure 16C:
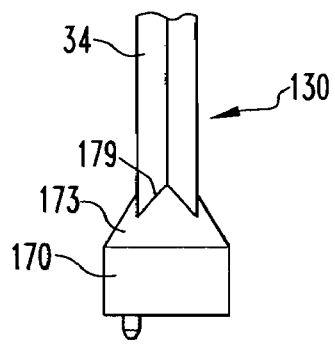

FIGS. 16A, 16B and 16C show one non-limiting example of an optional indexable guide 110 for facilitating positioning of the baffle plate segments such as, for example, the B plate segment 28 and angle plates 34 shown in FIG. 16A, into a racking assembly 130', in accordance with another aspect of the invention. Specifically, the exemplary indexable guide 110 includes opposing indexable guides in the form of shoe horns 170,171 which are structured to guide the plate segment 28 into the desired position in the racking assembly 130'. Specifically, one shoe horn 170 is fixed and one shoe horn 171 is movable. The shoe horns 170,171 include sloped surfaces 173,175, respectively, to guide (e.g., funnel) the plate segment 28 into the desired position (see, for example, plate segment 28 being funneled into position in FIG. 16B.

In operation, once the first baffle segment 28 is inserted into the desired nesting position, the movable shoe horn 171 is lifted and moved to the next nearby location. Holes 172 are provided to accept pins 177,177' of the shoe horn 171, in order that the shoe horn 171 is indexable to guide and next another baffle plate segment 28. In this manner, the operation continues until the plate segments 28 are arranged side-by-side in the desired position. The indexable guide 110 may also include a receptacle 179 (FIGS. 16A and 16C), for example, in the fixed shoe horn 170, in order to receive and store angle plates 34 (FIGS. 16A and 16C). It will, of course, be appreciated that a wide variety of other guidance devices (not shown) having any known or suitable configuration can be provided for the various baffle plates and/or segments 26,28, 30,32,34 which will eventually fill the racking assembly 130'. See also racking assembly 130 of the inner cask 102, shown in FIGS. 4A and 4B.

It should be noted, for example with respect to FIGS. 9A and 17A that the plates and/or segments 26,28,30,32,34 (FIGS. 2A-2B and 3-5) cannot be permitted to "break water" (e.g., be removed from the water) because of their relatively high radiation level. The elevation of the water level in the example of FIG. 9A is about 45 ft., 4 inches. It will, therefore, be appreciated that the plates and/or segments 26,28,30,32,34 can be lifted about 30 inches and still have about 12 inches of water coverage. Also, if necessary, the water level could be raised another 12 inches in the reactor cavity and still be 12 inches below the operating floor. A flotation device (not shown) can be used to shield the portion of the lower internals assembly 52, which has a much lower radiation level than the plates and/or segments 26,28,30,32,34, and which is above water when in the storage stand 8 (see, for example, FIG. 9A).

FIGS. 6 and 17A-17D illustrate the exemplary lifting fixtures 126 for maneuvering the casked load, and their attachment to the casked load. For simplicity of illustration, only one such fixture 126 is shown and described in detail. Specifically, three generally C-shaped (from the perspective of FIG. 17C) lifting lugs 174 engage the thermal shield support blocks 21, of which there are six spaced around the circumference of the core barrel 18 (FIGS. 17A and 17B). These are fixed points that anchor the thermal shield to the core barrel 18, and three of them will be used for a tripod lift of the casked load (see also, for example, the top plan view of FIG. 3, and the three lifting devices 126' thereof). With the lower internals section 52 still in the storage stand 8, and after attaching the top cover 105 to the inner cask 102, the outer cask 104 is lowered down over the internals 52. A tongue 176 of the C-shaped lifting lug 174 will pass up through a slot 115 in the top cover 111 of the outer cask 104. To restrain the lower internals package, threaded snubbers 178 (e.g., screws) are threaded in until they bear upon and put a compressive force on the outer diameter (O.D.) of the thermal shield, as shown in FIG. 17B. As best shown in FIG. 6, a jack-screw 180, shown located on the axial centerline of the top cover 111 of cask 104, will be threaded down to bear on the top cover 105 of the inner cask 102, thereby putting a compressive force on that cask 102. As many as five of these jack-screws 180 (one is shown) can be employed to secure the inner cask 102 in the vertical direction. Screw size for both snubbers 178 and jack screws 180 will preferably be on the order of about 2 to about 2.5 inches in diameter.

With the base plate member 117 positioned at some convenient location on the floor of the reactor cavity, as shown in FIG. 6, or on the operating deck (not shown), the outer cask 104 is lowered onto the bottom plate member 117, as shown. Once satisfied that the engagement and alignment of the outer cask 104 are correct, the cask 104 and the base plate member 117 are fixed together, for example, and without limitation, by pneumatically activated shear pins 182 entering holes in blocks 184 attached to the base plate member 117, as shown in FIG. 6.

The entire casked assembly can now be delivered to a predetermined location, for example, on the operating deck (not shown) of the containment building 2 (FIGS. 7 and 8) where it will be lowered onto and affixed to a skid 6, as previously described with respect to FIG. 7. The skid 6 resides on a suitable transfer vehicle such as, for example, the rail and train assembly 200 previously discussed with respect to FIG. 8. It will then be moved out of the containment. Further handling and final on-site storage or off-site disposal can then occur.

Figure 18:
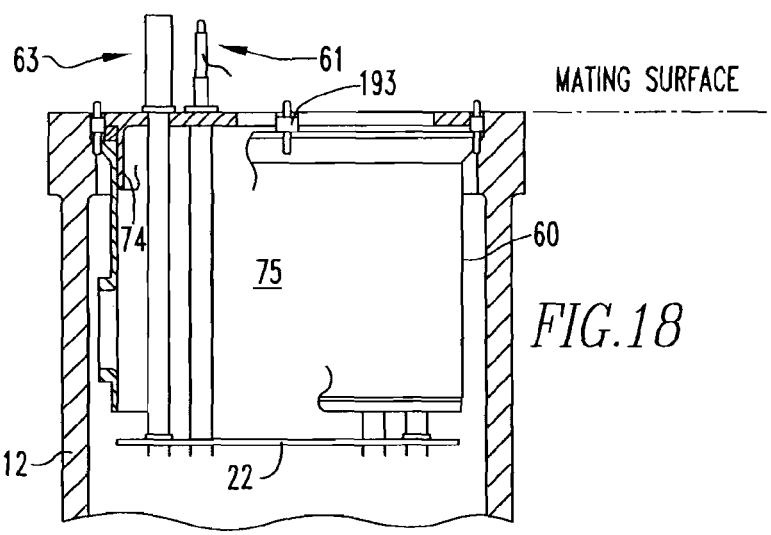
FIG. 18 is a side elevation, partly in section view of the upper internals of the reactor core placed within the upper section of the lower internals, residing in the pressure vessel.
Figure 19:
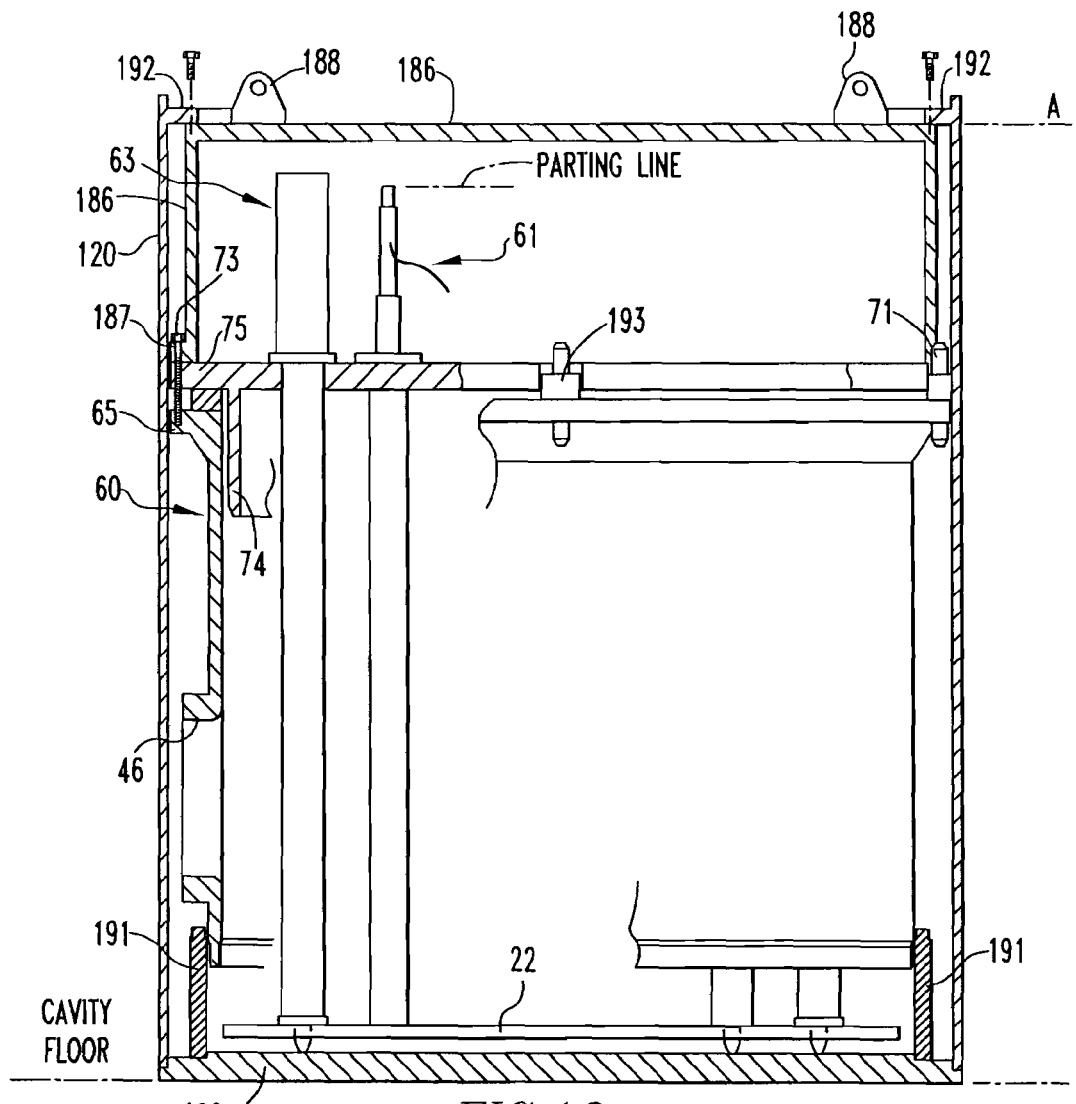
FIG. 19 is side elevation, partly in section view of the upper internals and upper section of the lower internals of FIG. 18 housed within a cask, in accordance with an embodiment of the invention.

Still to be disposed of, are the upper internals 74 and the upper section 60 of the lower internals 52. Specifically, when the lower internals assembly 52 was plasma cut, previously discussed with respect to FIG. 9A, the upper section 60 was placed in the pressure vessel 12, as shown in FIGS. 9B, 18 and 19. With the upper internals 74 situated in a storage stand (not shown), the operation of cutting or "demasting" the thermocouple support columns 61 must first be performed. As shown in FIGS. 18 and 19, these are located on the outer periphery of the upper internals assembly 74 where they are readily accessible for tooling. A cut will be made, for example and without limitation, with a large hydraulic shear (not shown), at an elevation on the thermocouple column 61 slightly below that of the top of the control rod guide tube extensions 63. The tops of the extensions 63 now establish the requisite height of the third shield cask 120. The exemplary third cask 120 has a height of about 190 inches. The severed portions (not shown) of the thermocouple columns 61, which have relatively low grade radiation levels, are placed in disposable containers (not shown) that will be supplied by the utility customer.

Next, the standard left rig used to transfer the upper internals 74, moves them from their storage stand (not shown) and deposits them in the upper section of the lower internals 60 (see (FIG. 9B), which is residing in the pressure vessel 12. FIG. 18 depicts this situation, with the lifting rig removed.

The lifting frame 186, which also serves as the shielding for the top of the upper internals 74, is lowered into position and set atop the lower internals top support plate 75, and is guided into position by the head and vessel alignment pins 71. These three elements, namely the lifting frame 186, the upper internals 74 and the section of lower internals 60, are clamped and secured together by at least four bolts 73 which pass through the flange 187 of the lifting frame 186 and upper internals support plate flange 77 and thread into the flange 65 of the lower internals sections 60. Threaded holes exist for attachment of the left rig which is used to transport the lower internals.

Moving these three joined elements 186,74,60 into the cask 120, can be accomplished in at least two ways. The preferred embodiment is to position the cask 120 over the pressure vessel 12, supported on the operating deck floor. A lift rig (not shown) is then lowered to engage the lift points 188 on the lifting frame 186. The load is then lifted up into the cask 120 until it comes into contact with the cask flange 192. Adequate guide pins (not shown) are provided at the interface of 186 and 192 to cause the alignment of features which allow the cask 120 to be bolted to the lifting frame 186 at about 12 locations on the prescribe bolt circle.

The cask bottom plate 190, which includes the cylindrical shielding element 191 can be attached in one of two preferred ways. First, it can be positioned beneath the cask 120 and hoisted (e.g., without limitation, with hydraulic jacks) into the final position shown in FIG. 19. Alternatively, the plate 190 can be placed at a location that is suitable and available, and the package of 186, 74, and 60 can be transported to a position above the plate 190 and lowered onto it. In either case, the casked package is completed by securing the plate 190 to the cask 120 with threaded suitable fasteners (not shown). The loaded cask 120 can now be lifted and moved out of containment in the same fashion as the other casked internals, previously described hereinabove. However, it will be appreciated that this latter casked load is shorter and weights considerably less than the aforementioned cask-in-cask package.

It will be appreciated that the upper core plate 22 is the most highly radiation activated element in the package. Sufficient shielding is accomplished by making the plate 190 as thick as needed. In addition, the cylindrical shielding element 191 can be increased in diameter, and it can be extended upward (not shown) as high as necessary, for example, to pass through the gap between nozzles 46 and the cask 120 inside diameter. This gap is about 3.4 inches. This will increase the weight of the package, but it will pass through the equipment hatch (FIGS. 7 and 8). Portable cranes (not shown) can also be brought in to supplement the existing polar crane if required.

It will also be appreciated that although the above steps have been described as if they were in series, that the method of disassembling, casking and/or removing internal structural members of the core in accordance with embodiments of the invention can be conducted in parallel to even further reduce costly plant outage time. For example, once the lower internals 52 have been sectioned (e.g., plasma cut), and the upper portion 60 has been transferred to the pressure vessel 12, the upper internals 74 can be transferred over and installed (see FIG. 18), and casking of that load could be accomplished while baffle bolts 36 (FIGS. 2B and 10) are being removed, in the manner described hereinabove. That cask 120 could then be removed from containment, leaving the pressure vessel 12 empty. This enables the customer to perform a mandatory in-service vessel inspection, for example, thus saving valuable time during the same outage, thereby avoiding or minimizing a future outage.

Internals replacement implies new internals on-site to be installed during the same plant outage. Dimensions of critical features on the pressure vessel 12 will, therefore, need to be taken in order to custom machine interfacing features on the new lower internals. Special gauges, fixtures and inspection devices are required to do this. This process is disclosed, for example, in U.S. Pat. No. 5,864,594, which is hereby incorporated herein by reference. Such dimensions can be taken, for example, at the time when the baffle plates and/or segments 26,28,30,32,34 are being removed and casked. In this manner, outage time can be saved. Still further time may be saved by performing the final machining of the key components such as, for example and without limitation, the lower radial support keys 194 shown in FIGS. 1, 6, 9A and 17A. Once machined, final installation of such keys onto the lower internals can be performed with the replacement set being secured in a stand (not shown) located on the cavity operating floor 3. Trial fit-up of the new lower internals into the vessel 12 can be done while the lower cask 104 (e.g. lower section 52, inner cask 102, and baffle plates and/or segments 26,28, 30,32,34) are being transported out of the containment building 2.

It will be appreciated that the shielded casks 102,102',104 described herein may be made from any known or suitable irradiation shielding material such as, for example and without limitation, painted carbon steel which may be rolled, or comprised of welded plate or castings and stacked one on top of the other and welded to form an extended cylinder or an octagonal shape, or formed in any other known or suitable manner. For example, as one non-limiting alternative, the casks 102,102',104 might comprise concentric cylinders or octagons with an annulus filled with lead shot as a shielding medium. This alternative would reduce the size of cost of the resulting inner cask 102,104' that contains the baffle plates and/or segments 26,28,30,32,34.

It is believed that the entire operation of removing and replacing both the upper and lower internals 52,74 in accordance with the disclosed method can be accomplished in about 70 days or less of critical path in the outage. Such period begins once the existing internals are secured in their respective storage stands (under water), and ends when the plant is turned back over to the customers to begin the core refueling phase.

In summary, an improved internals removal method is provided by the invention, which entails the selective dismantling of as few of the structural elements as possible, while establishing an end result of a small, light, disposable casked load capable of being removed through the plant's existing equipment hatch, and with all of the foregoing being achieved in a reasonable amount of time. More specifically, a unique combination of casks 102,102',104,120 in a novel configuration achieves the remarkable result of reducing the necessary wall thickness 118 of the outer cask 104 from the known required dimension of about 11 inches to as little as about 2.0 inches. In particular, the highly irradiated core baffle plates and/or segments 26,28,30,32,34 are removed and isolated by placing them in an individual inner storage cask 102,102' positioned at the axial centerline of the lower core plate 24. At this location, which is about 40 inches (on average) inboard of their normal position, and with them being shrouded in the inner cask 102, which has a wall thickness 18 of its own of about 7.5 inches, radiation levels on the outer diameter (O.D.) of the outer cask 104 can meet a prescribed mR/hr. contact level, for example, needed to move out of reactor containment and into a storage bunker (generally constructed of concrete) (not shown) on site. In addition, the resulting size and weight of the loaded outer cask 104 is reduced to the extent that it can be removed through the existing equipment hatch 4 and is within the lifting capability of the plant's on-site crane.

It will further be appreciated that additional shielding can be provided, if necessary, be removing the eight specimen baskets 11 shown in FIG. 2A. Such removal can be accomplished by any known or suitable process such as, for example and without limitation, plasma burning. This would allow the inner diameter (I.D.) of the lower cask 104 to be reduced to the extent that the wall of the lower cask 104 can be increased from about 2.0 inches to about 4.7 inches. This thickness can comprise, for example, all carbon steel or concentric cylinders filled with lead. The resultant increase in weight could be accommodated by a portable crane (not shown) brought into containment to supplement the existing polar crane (not shown), if necessary. Most importantly, the casked internals could still be moved out of the existing equipment hatch 4 (FIGS. 7 and 8).

Significant benefits result from the dramatic decrease in size and weight of the shielding casks in accordance with the invention, when compared, for example to the known prior art. Specifically, in addition to the already noted easement of handling and transporting the smaller casks, the number of qualified suppliers who can now manufacture these smaller components expands considerably. Accordingly, competitive pricing comes into play, and manufacturing time schedules are greatly reduced.

While specific embodiment of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention is to be given the full breadth of the claims appended and any and all equivalents thereof.

What is claimed is:

1. A method of removing radioactive internals structural members in the core of a reactor pressure vessel in a containment vessel, the reactor pressure vessel including a core barrel, a lower internals assembly and an upper internals assembly, the method comprising the steps of:
   removing the core barrel from the reactor pressure vessel;
   severing the lower internals assembly into an upper section and a lower section;
   placing a first cask in the lower section of the lower internals assembly, the lower section of the lower internals assembly including radioactive first internals structural members and second internals structural members, the first internals structural members being attached to the second internals structural members;
   detaching the radioactive first internals structural members from the second internals structural members;
   placing the detached first internals structural members in the first cask;
   placing the first cask and the second internals structural members, in a second cask;
   bracing the first cask within the second cask;
   placing the upper internals assembly and the severed upper section of the lower internals assembly in a third cask;
   removing the second cask containing the lower section of the lower internals assembly, the second internals structural members, and the casked detached radioactive first internals structural members from the containment vessel; and
   removing the third cask containing the upper internals assembly and the severed upper section of the lower internals assembly from the containment vessel.

2. The method of claim 1 wherein the first internals structural members comprise radioactive baffle plates and the second internals members comprise former plates bolted to the radioactive baffle plates; and wherein the step of detaching the radioactive first internals members from second internals members comprises the step of:
   unbolting the radioactive baffle plates from the former plates.

3. The method of claim 2 wherein the baffle plates have a plurality of segments; and wherein the step of unbolting the radioactive baffle plates from the former plates comprises the step of:
   unbolting the baffle plate segments from the former plates.

4. The method of claim 2 wherein the baffle plates are fastened to the former plates by bolts secured by lock bars welded to the baffle plates; and wherein the step of unbolting the radioactive baffle plates from the former plates comprises the steps of:
   placing a strong back near a baffle plate bolt;
   placing a tool between the strong back and the baffle plate bolt;
   placing a pneumatic cavity between the tool and the strong back;
   expanding the pneumatic cavity to urge the tool into engagement with the baffle plate bolt;
   cutting or breaking the lock bar securing the baffle plate bolt; and
   unbolting the baffle plate bolt with the tool.

5. The method of claim 4 wherein the step of placing a strong back near a baffle plate bolt comprises the step of:
   keying the strong back with the lower internals assembly to precisely position the strong back.

6. The method of claim 1 wherein the lower internals assembly has a plate member disposed at one end of a barrel member; and wherein the step of placing the first cask in the lower internals assembly comprises:

placing the first cask on the lower internals assembly plate member in spaced relationship from the barrel member.

7. The method of claim 6 wherein the lower internals assembly plate member has guide members; wherein the first cask has a base plate member; and wherein the step of placing the first cask on the lower internals assembly plate member and in spaced relationship from the barrel member comprises:

lowering the first cask base plate member over the guide members.

8. The method of claim 7 wherein the first cask has a number of detachable side wall members; and wherein the step of placing the detached first internals structural members in the first cask comprises:

placing the detached first internals structural members on the first cask base plate member after the first cask base plate member is lowered over the guide members; and attaching the number of first cask detachable side wall members to the first cask base plate member after the detached first internals structural members have been placed on the first cask base plate member.

9. The method of claim 1, further comprising:

draining water from the first cask in the lower internals assembly.

10. The method of claim 1, further comprising:

positioning indexable guides in the first cask proximate the detached first members.

11. The method of claim 1 wherein the first cask and the second cask each have a wall thickness; and wherein the wall thickness of the first cask is greater than the wall thickness of the second cask.

12. The method of claim 11 wherein the wall thickness of the first cask is at least twice the wall thickness of the second cask.

13. The method of claim 1 wherein the first cask and the second cask are made from substantially similar materials of construction.

14. The method of claim 1, wherein the detached first internals members have radiation contact levels of at least 500,000 R/hr; and wherein the second cask has an outside surface with a radiation level of about 800 mR/hr. or less.

15. The method of claim 1, further comprising:

placing the upper internals assembly into the severed upper section of the lower internals assembly;

placing the severed upper section of the lower internals assembly containing the upper internals assembly into the third cask; and removing the third cask containing the severed upper section of the lower internals assembly and the upper internals assembly from the containment vessel.

16. The method of claim 15 wherein the upper internals assembly has extending members; and wherein the method further comprises:

severing the extending members from the upper internals assembly before the step of placing the upper internals assembly in the third cask.

17. The method of claim 1 wherein the first cask further comprises a plurality of radial arms structured to extend radially outwardly from the first cask; and wherein the method further comprises:

extending the radial arms to engage the lower internals assembly, thereby stabilizing the first cask within the lower internals assembly and the second cask.

* * * * *